US008484022B1

(12) United States Patent
Vanhoucke

(10) Patent No.: US 8,484,022 B1
(45) Date of Patent: Jul. 9, 2013

(54) ADAPTIVE AUTO-ENCODERS

(75) Inventor: Vincent Vanhoucke, San Francisco, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/560,740

(22) Filed: Jul. 27, 2012

(51) Int. Cl.
*G10L 15/00* (2006.01)
*G10L 11/06* (2006.01)
*G10L 19/14* (2006.01)
*G10L 19/12* (2006.01)
*G06F 17/27* (2006.01)
*G06F 15/18* (2006.01)
*G05B 13/02* (2006.01)

(52) U.S. Cl.
USPC ............... 704/240; 704/9; 704/224; 704/222; 704/208; 704/246; 706/20; 706/16; 706/25; 700/48

(58) Field of Classification Search
USPC ........ 704/9, 240, 224, 222, 246, 208; 706/20, 706/16, 25; 700/48
See application file for complete search history.

(56) References Cited

U.S. PATENT DOCUMENTS

| | | | |
|---|---|---|---|
| 5,502,790 A | | 3/1996 | Yi |
| 5,535,305 A | | 7/1996 | Acero et al. |
| 5,548,684 A | * | 8/1996 | Wang et al. ...................... 706/16 |
| 5,555,344 A | | 9/1996 | Zunkler |
| 5,692,100 A | * | 11/1997 | Tsuboka et al. ............... 704/222 |
| 5,737,486 A | * | 4/1998 | Iso ................................. 704/232 |
| 5,794,197 A | | 8/1998 | Alleva et al. |
| 5,867,816 A | * | 2/1999 | Nussbaum .................... 704/232 |
| 5,930,754 A | * | 7/1999 | Karaali et al. ................ 704/259 |
| 6,092,039 A | | 7/2000 | Zingher |
| 6,233,550 B1 | * | 5/2001 | Gersho et al. ................. 704/208 |
| 6,363,289 B1 | * | 3/2002 | Keeler et al. .................... 700/48 |
| 6,475,245 B2 | * | 11/2002 | Gersho et al. ................. 704/208 |
| 6,760,699 B1 | | 7/2004 | Weerackody et al. |
| 6,845,357 B2 | | 1/2005 | Shetty et al. |
| 6,907,398 B2 | * | 6/2005 | Hoege ........................... 704/265 |
| 6,963,837 B1 | | 11/2005 | Finke et al. |
| 7,233,899 B2 | | 6/2007 | Fain et al. |
| 7,467,086 B2 | | 12/2008 | Menendez-Pidal et al. |

(Continued)

OTHER PUBLICATIONS

N. Morgan and H. Bourlard. "An Introduction to Hybrid HMM/Connectionist Continuous Speech Recognition". IEEE Signal Processing Magazine, pp. 25-42, May 1995.

(Continued)

*Primary Examiner* — Pierre-Louis Desir
*Assistant Examiner* — Neeraj Sharma
(74) *Attorney, Agent, or Firm* — McDonnell Boehnen Hulbert & Berghoff LLP

(57) ABSTRACT

A method and system for adaptive auto-encoders is disclosed. An input audio training signal may be transformed into a sequence of feature vectors, each bearing quantitative measures of acoustic properties of the input audio training signal. An auto-encoder may process the feature vectors to generate an encoded form of the quantitative measures, and a recovered form of the quantitative measures based on an inverse operation by the auto-encoder on the encoded form of the quantitative measures. A duplicate copy of the sequence of feature vectors may be normalized to form a normalized signal in which supra-phonetic acoustic properties are reduced in comparison with phonetic acoustic properties of the input audio training signal. The auto-encoder may then be trained to compensate for supra-phonetic features by reducing the magnitude of an error signal corresponding to a difference between the normalized signal and the recovered form of the quantitative measures.

20 Claims, 13 Drawing Sheets

U.S. PATENT DOCUMENTS

| | | | |
|---|---|---|---|
| 7,574,357 B1* | 8/2009 | Jorgensen et al. | 704/236 |
| 7,660,774 B2* | 2/2010 | Mukherjee et al. | 706/20 |
| 7,826,894 B2* | 11/2010 | Musallam et al. | 600/544 |
| 8,010,358 B2* | 8/2011 | Chen | 704/246 |
| 8,239,195 B2* | 8/2012 | Li et al. | 704/233 |
| 8,311,827 B2 | 11/2012 | Hernandez et al. | |
| 2002/0128834 A1 | 9/2002 | Fain et al. | |
| 2004/0064315 A1 | 4/2004 | Deisher et al. | |
| 2004/0236573 A1* | 11/2004 | Sapeluk | 704/224 |
| 2008/0059200 A1 | 3/2008 | Puli | |
| 2008/0147391 A1 | 6/2008 | Jeong et al. | |
| 2008/0208577 A1 | 8/2008 | Jeong et al. | |
| 2009/0048843 A1 | 2/2009 | Nitisaroj et al. | |
| 2010/0121638 A1 | 5/2010 | Pinson et al. | |
| 2010/0185436 A1 | 7/2010 | Saleh et al. | |
| 2010/0198598 A1 | 8/2010 | Herbig et al. | |
| 2010/0217589 A1 | 8/2010 | Gruhn et al. | |
| 2011/0288855 A1* | 11/2011 | Roy | 704/9 |
| 2012/0072215 A1 | 3/2012 | Yu et al. | |

OTHER PUBLICATIONS

Gales, M.J.F., "Maximum Likelihood Linear Transformations for HMM-Based Speech Recognition," Technical Document CUED/F-INFENG/TR 291, Cambridge University Engineering Department, May 1995, from ftp://svr-ftp.eng.cam.ac.uk/pub/reports/auto-pdf/gales_tr291.pdf.

Anastasakos, T.; McDonough, J.; Makhoul, J., "A compact model for speaker-adaptive training," Spoken Language, 1996. ICSLP 96. Proceedings., Fourth International Conference on Oct. 3-6, 1996, vol. 2, pp. 1137-1140, from http://www.asel.udel.edu/icslp/cdrom/vol2/764/a764.pdf.

Eide, Ellen, and Gish, Herbert, "A parametric approach to vocal tract length normalization," Acoustics, Speech, and Signal Processing, 1996. ICASSP-96. Conference Proceedings., 1996 IEEE International Conference on May 9, 1996, vol. 1, pp. 346-348, from http://www.ee.columbia.edu/~dpwe/papers/EideG96-vtln.pdf.

Sim et al. "Stream-based context-sensitive phone mapping for cross-lingual speech recognition." Interspeech 2009, Sep. 2009, pp. 3019-3022.

Sim, Khe Chai. "Discriminative product-of-expert acoustic mapping for cross-lingual phone recognition." Automatic Speech Recognition & Understanding, 2009. ASRU 2009. IEEE Workshop on. IEEE, Dec. 2009, pp. 546-551.

Guangsen et al. "Comparison of Smoothing Techniques for Robust Context Dependent Acoustic Modelling in Hybrid NN/HMM Systems." Interspeech 2001, Aug. 2011, pp. 457-460.

Young et al. "Tree-based state tying for high accuracy acoustic modelling." Proceedings of the workshop on Human Language Technology. Association for Computational Linguistics, 1994, pp. 307-312.

Ziegenhain et al. "Triphone tying techniques combining a-priori rules and data driven methods." European Conference on Speech Communication and Technology (Eurospeech). vol. 2. 2001, pp. 1-4.

Ming, Ji, and F. Jack Smith. "Improved phone recognition using Bayesian triphone models." Acoustics, Speech and Signal Processing. 1998. Proceedings of the 1998 IEEE International Conference on. vol. 1. IEEE, 1998, pp. 1-4.

Office Action in U.S. Appl. No. 13/560,706 mailed Nov. 28, 2012.

Office Action in U.S. Appl. No. 13/560,658 mailed Dec. 12, 2012.

\* cited by examiner

ADAPTIVE AUTO-ENCODERS

BACKGROUND

Unless otherwise indicated herein, the materials described in this section are not prior art to the claims in this application and are not admitted to be prior art by inclusion in this section.

A goal of automatic speech recognition (ASR) technology is to map a particular utterance to an accurate textual representation, or other symbolic representation, of that utterance. For instance, ASR performed on the utterance "my dog has fleas" would ideally be mapped to the text string "my dog has fleas," rather than the nonsensical text string "my dog has freeze," or the reasonably sensible but inaccurate text string "my bog has trees." Various technologies, including computers, network servers, telephones, and personal digital assistants (PDAs), can be employed to implement an ASR system, or one or more components of such a system. Communication networks may in turn provide communication paths and links between some or all of such devices, supporting ASR capabilities and services that may utilize ASR capabilities.

BRIEF SUMMARY

In one aspect, an example embodiment presented herein provides, a method comprising: transforming an input audio training signal, using one or more processors of a system, into a sequence of feature vectors, each feature vector of the sequence bearing quantitative measures of acoustic properties of the input audio training signal; processing the sequence of feature vectors with an auto-encoder implemented by the one or more processors to generate (i) an encoded form of the quantitative measures, and (ii) a recovered form of the quantitative measures based on an inverse operation by the auto-encoder on the encoded form of the quantitative measures; processing a duplicate copy of the sequence of feature vectors with a normalizer implemented by the one or more processors to generate a normalized form of the quantitative measures in which supra-phonetic acoustic properties of the input audio training signal are reduced in comparison with phonetic acoustic properties of the input audio training signal; determining an error signal based on a difference between the normalized form of the quantitative measures and the recovered form of the quantitative measures; providing the error signal to the auto-encoder; and by adjusting parameters of the auto-encoder to reduce the magnitude of the error signal, training the auto-encoder to compensate for supra-phonetic acoustic properties of input audio signals.

In another aspect, an example embodiment presented herein provides, a system comprising: one or more processors; memory; and machine-readable instructions stored in the memory, that upon execution by the one or more processors cause the system to carry out operations comprising: transforming an input audio training signal into a sequence of feature vectors, wherein each feature vector of the sequence bears quantitative measures of acoustic properties of the input audio training signal, processing the sequence of feature vectors with an auto-encoder to generate (i) an encoded form of the quantitative measures, and (ii) a recovered form of the quantitative measures based on an inverse operation by the auto-encoder on the encoded form of the quantitative measures, processing a duplicate copy of the sequence of feature vectors with a normalizer to generate a normalized form of the quantitative measures in which supra-phonetic acoustic properties of the input audio training signal are reduced in comparison with phonetic acoustic properties of the input audio training signal, determining an error signal based on a difference between the normalized form of the quantitative measures and the recovered form of the quantitative measures, providing the error signal to the auto-encoder, and by adjusting parameters of the auto-encoder to reduce the magnitude of the error signal, training the auto-encoder to compensate for supra-phonetic acoustic properties of input audio signals.

In still another aspect, an article of manufacture including a computer-readable storage medium, having stored thereon program instructions that, upon execution by one or more processors of a system, cause the system to perform operations comprising: transforming an input audio training signal into a sequence of feature vectors, wherein each feature vector of the sequence bears quantitative measures of acoustic properties of the input audio training signal; processing the sequence of feature vectors with an auto-encoder to generate (i) an encoded form of the quantitative measures, and (ii) a recovered form of the quantitative measures based on an inverse operation by the auto-encoder on the encoded form of the quantitative measures; processing a duplicate copy of the sequence of feature vectors with a normalizer to generate a normalized form of the quantitative measures in which supra-phonetic acoustic properties of the input audio training signal are reduced in comparison with phonetic acoustic properties of the input audio training signal; determining an error signal based on a difference between the normalized form of the quantitative measures and the recovered form of the quantitative measures; providing the error signal to the auto-encoder; and by adjusting parameters of the auto-encoder to reduce the magnitude of the error signal, training the auto-encoder to compensate for supra-phonetic acoustic properties of input audio signals.

These as well as other aspects, advantages, and alternatives will become apparent to those of ordinary skill in the art by reading the following detailed description, with reference where appropriate to the accompanying drawings. Further, it should be understood that this summary and other descriptions and figures provided herein are intended to illustrative embodiments by way of example only and, as such, that numerous variations are possible. For instance, structural elements and process steps can be rearranged, combined, distributed, eliminated, or otherwise changed, while remaining within the scope of the embodiments as claimed.

DETAILED DESCRIPTION

1. Overview

Figure 1:
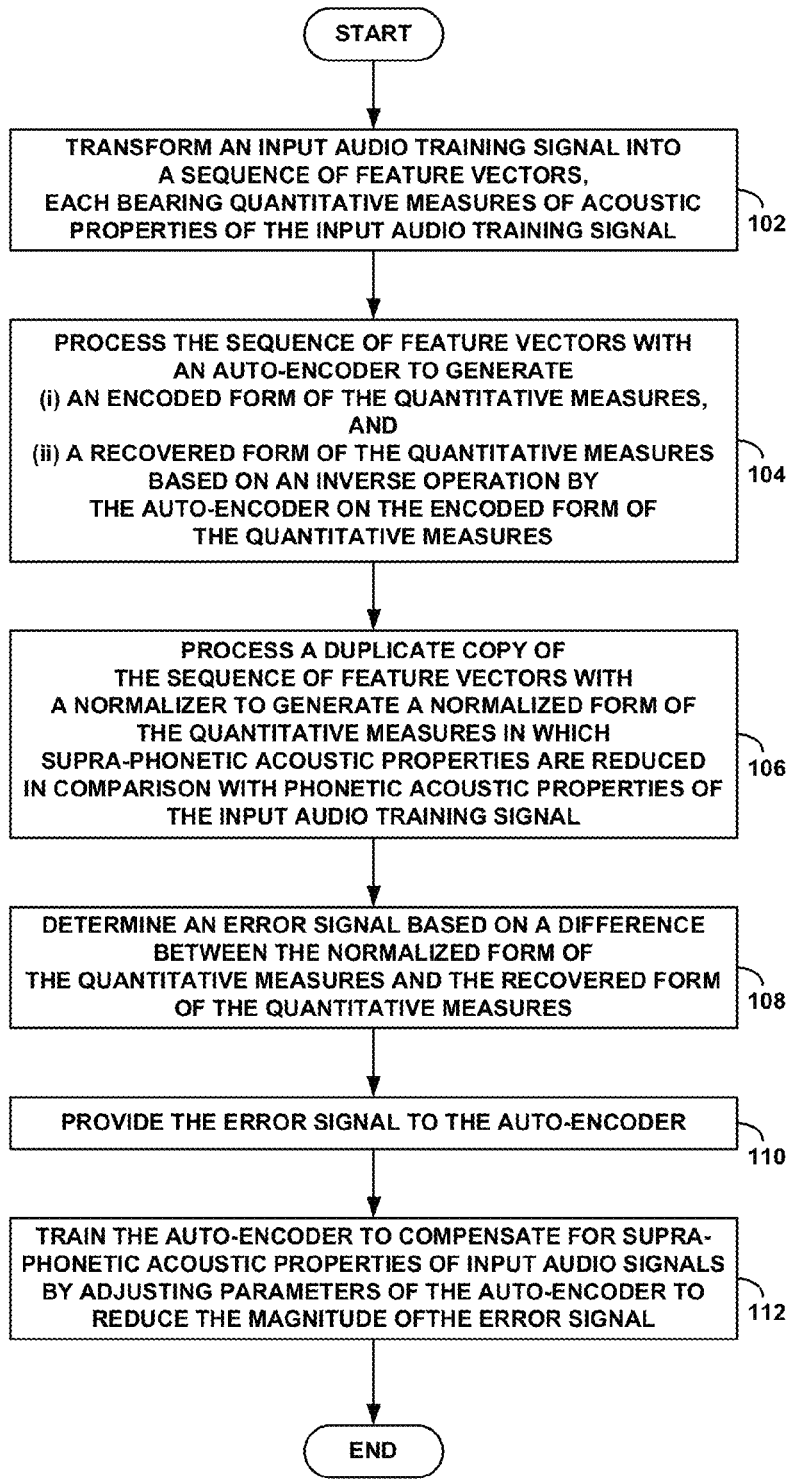
FIG. 1 is a flowchart illustrating an example method in accordance with an example embodiment.

An automatic speech recognition (ASR) system can be a processor-based system configured to recognize a spoken utterance in an audio input signal, and responsively carry out an action associated with, or corresponding to, recognition of the utterance. The spoken utterance could be a word, multiple words, a phrase, multiple phrases, a sentence, multiple sentences, or other segment of speech, for example. The source of the spoken utterance could be a live person speaking in real time into a microphone, telephone, or other audio input/transmission device/system, for example, that then produces and supplies the audio signal as input to the ASR system. The source of the spoken utterance could also be previously-recorded speech that is played out via an audio output device/system, for example, and supplied as the audio input signal to the ASR system. The action associated with, or corresponding to, recognition of the utterance could be translation of the recognized utterance into text, and output and/or recording of the text. The action could also be generation of a response to the recognized utterance, such as synthesis of a reply (e.g., via a voice/sound synthesis device/system), or carrying out a command. Other responses are possible as well.

An ASR system may operate by receiving an input audio signal, processing the input audio signal (e.g., using a digital signal processor) to generate a quantified representation of the signal, and then performing pattern recognition in which the quantified representation of the input signal is matched in some manner against a stored body of similarly quantified representations. The stored body, often referred to as a "corpus," is typically a large collection of speech samples that have been digitally processed, deconstructed, and categorized into a finite set of small, fundamental units of speech sounds, as well as possibly a finite set of larger speech segments (e.g., words, phrases, etc.). The fundamental units may also have associated "tags" or labels that can be used to identify them for purposes of generating text or other output from strings or sequences of units, for example.

By way of example, the small fundamental units could be phonemes. There are, for example, approximately 40 phonemes in spoken English. Spoken words (or other segments of speech) can be constructed from appropriate sequences of subsets of these phonemes. In speech, phonemes may occur in a context of other phonemes. For example, phonemes may occur in triplet combinations referred to as "triphones." In a triphone, a given phoneme can appear in the context of a preceding phoneme and a following (subsequent) phoneme. Accordingly, the fundamental units could instead be, or in addition include, triphones. It is also possible to recognize "quinphones" (groups of five phonemes), as well as other grouping sizes.

The phonemes (or other small fundamental speech units) of the corpus can be represented and stored in one or another quantitative form. Accordingly, by processing the audio input signal in short units that can be quantitatively compared with stored phonemes or sequences of the stored phonemes, a matching technique can be employed to identify a likely sequence or sequences of stored phonemes that corresponds to the processed audio input signal. In this way, the spoken utterance in the input audio signal can be recognized as corresponding to a synthesized utterance reconstructed from the corpus of stored speech sounds.

At a high-level, the architecture of an ASR system may include a signal processing component, a pattern classification component, an acoustic model component, a language model component, and a dictionary component (among other possible components). The signal processing component receives the audio input signal, digitally samples it within a sequence of time frames, and processes the frame samples to generate a corresponding sequence of "feature vectors." Each feature vector includes a set of measured and/or derived elements that characterize the acoustic content of the corresponding time frame. This process is sometimes referred to as "feature extraction." The acoustic content represented in a feature vector can correspond to some portion of one or more fundamental speech units (e.g., phoneme, triphone, etc.), and thus can be used for matching against the speech units of the corpus.

The pattern classification component receives a sequence of feature vectors as input, and can apply the acoustic model, language model, and dictionary in order to carry out the recognition process. The acoustic model can access the corpus and can implement the search/comparison process to determine optimal sequences of phonemes, triphones, or other fundamental speech units. The language model includes rules of the spoken language (e.g., grammar, syntax, etc.) that can be applied to help guide and/or constrain the recognition process, while the dictionary component may provide semantic constraints at the word level. The corpus may also include identifications or "labels" of its contents, so that the synthesized utterances reconstructed from the corpus of stored speech sounds can be rendered in text or other formats suitable for enabling the ASR system to generate a response (or responses) to recognition of spoken utterances. The output of the pattern classification component is the recognized speech carried in the utterance. The form of the output could be a text string or an action corresponding to the recognized speech, for example.

Among various approaches for implementing the acoustic model, the "hybrid neural network/hidden Markov model" (HNN/HMM) approach can provide computational advantages. In a HNN/HMM approach, phonemes, triphones, or other fundamental speech units are modeled probabilistically as respective groupings of HMM states. More specifically, each fundamental speech unit is seen as temporally evolving according to some sequence of temporal phases of the speech unit. It has been observed empirically, for example, that phonemes manifest in speech across three acoustic phases: a start, a middle, and an end. A given phoneme (or other fundamental speech unit) therefore can be reasonably modeled with three states, one corresponding to each acoustic phase. Transitions between states are governed by transition probabilities of the model. In addition, each state has an associated "emission probability" for "emitting" an output corresponding to the acoustic phase of the phoneme. For purposes of the discussion herein, the three HMM states described as modeling a given phoneme (or other fundamental speech unit) will be referred to collectively simply as "a HMM for the given phoneme." Thus, a HMM for a given phoneme (or other fundamental speech unit) will be understood as being characterized by probabilities of transitioning from a current state to a next state, and upon transitioning, a respective probability of producing (emitting) the acoustic phase associated with the next state. It will be appreciated that a HMM for modeling a fundamental speech unit is not necessarily limited to three states, and that HMMs with greater than or fewer than three states are possible.

Sequential feature vectors derived from an audio input stream represent a stream of observed acoustic data, while sequential states of one or more HMMs may be concatenated to represent probable sequences of phonemes, triphones, or other fundamental speech units in the corpus that correspond to the observed acoustic data. The term "concatenated HMMs" will be used to refer to a concatenation of respective groupings of HMM states, where each respective grouping models a fundamental speech unit (as defined above). The states and models are "hidden" in the sense that, while the possible states and their associated transition and emission probabilities may be known, the specific state sequences associated with any given observed sequence of feature vectors is not a priori known. Recognition of utterances (speech) in the audio input signal therefore can be thought of as determining the most probable sequence (or sequences) of states of one or more concatenated HMMs that would produce the observed feature vectors. The most probable sequence of states then corresponds to the most probable sequence of phonemes, triphones, or other fundamental speech units in the corpus, from which the input utterance can be reconstructed and thereby recognized.

In HNN/HMM operation, the determination of the most probable sequences of HMMs and states is carried out one step at a time, with each time step corresponding to the next feature vector (i.e., frame) in the observed (input) stream. The neural network in the HNN/HMM approach functions to generate the emission probabilities for all of the states that need to be considered at each step. The input to the neural network is one or more feature vectors, where a sequence of multiple feature vectors can provide additional context for processing by the neural network of a given feature vector of the sequence. Thus, at a high level, the neural network serves to connect the observed data with the model.

More particularly, by learning from "example" data in the corpus or in ancillary training data, the neural network may be "trained" to recognize example data in "new" feature vectors that are input at runtime, but that the neural network hasn't necessarily seen before. The emission probabilities may thus be determined based on recognizing the runtime feature vectors as new examples of known feature vectors. The process by which the neural network is trained to recognize feature vectors (or other quantitative measures of acoustic properties of an audio input signal) is typically based on operating the neural network as an auto-encoder that is trained to match its output to its input.

An auto-encoder can be viewed conceptually as a forward neural network operated in series with an inverse version of itself, so that the output of the inverse neural network is as close as possible to the initial input to the forward neural network. The output of the forward neural network can be considered an encoded form of the initial input. In an auto-encoder, the encoded output of the forward neural network is fed back to the inverse version of the neural network, which effectively reverses (e.g., decodes) the encoding to yield a close copy of the initial input as the output of the auto-encoder. Since the encoded form of the input may be modified in some manner with respect to the un-encoded input, the output of the auto-encoder may not be identical to the initial, un-encoded input. A conventional approach to training is to provide the auto-encoder with a feedback "error signal" based on a difference between its output and its initial, un-encoded input. The auto-encoder can be adjusted to minimize the difference and thereby generate an output that is as close as possible to the initial input. Thereafter, the auto-encoder may be able to recognize new input as being the same or similar to data with which it was trained.

Once an auto-encoder is trained to an acceptable level of operation, the neural network may then operate to encode input data received at runtime and provide the encoded data to one or another system or system component that depends on or expects reliable recognition. In a HNN/HMM system, the trained neural network takes feature vectors as input, and provides the emission probabilities as output.

In practice, spoken language can contain phonetic characteristics associated with fundamental acoustic properties of speech units (e.g., phonemes, triphones, etc.), as well as "supra-phonetic" characteristics associated with acoustic properties such as pitch, tempo, etc., that can vary from one speaker another. Supra-phonetic features may also be indicative of environmental effects, such as noise, echo, or channel distortion, for example. Feature vectors generated from signal processing of an input audio signal may therefore include both phonetic features and supra-phonetic features.

The presence of supra-phonetic features can pose challenges to neural network recognition of feature vectors by blurring the distinction between otherwise distinguishable fundamental speech units (among other possible deleterious effects). One way to help mitigate or compensate for supra-phonetic features can be to "normalize" feature vectors before inputting them to a conventionally trained neural network. While normalization may help remove or reduce the effects of supra-phonetic features, it may also be costly in terms of processor resources and/or time, thereby making normalization during real-time operation of a HNN/HMM system impractical. Accordingly, there is a need for speech recognition techniques that can handle supra-phonetic features in an efficient manner and that can be applied to real-time operation of speech recognition systems.

Example embodiments described herein introduce an adaptive auto-encoder in which an error signal based on a difference between the output of the adaptive auto-encoder and a normalized form of the input to the adaptive auto-encoder is applied to a training process. More particularly, an input audio training signal may be processed (e.g., via digital signal processing) to generate a sequence of feature vectors (or more generally, a sequence of quantitative measures of acoustic properties of the input audio training signal). In general, the feature vectors of the sequence may include supra-phonetic features in addition to phonetic features. The sequence of feature vectors, corresponding to un-normalized signal data, may be input to the adaptive auto-encoder, which then outputs a "recovered form" of the un-normalized input signal data. A duplicate copy of the un-normalized input signal data may also be processed into a normalized form, and an error signal based on the difference between the normalized form and the recovered form can be applied as a feedback to the adaptive auto-encoder during training. By doing so for a body of training data, the adaptive auto-encoder can be trained to subsequently accept an un-normalized input data signal and, in real time, effectively recognize a normalized form of that signal, even though normalization is not necessarily performed on the subsequent, un-normalized input data signal. A neural network trained in this manner can then function to reliably recognize fundamental speech units in un-normalized input data, and thereby generate HMM state emission probabilities for input data that may contain supra-phonetic features.

The training procedure may be carried out largely offline with respect to real-time operation of an ASR system. Accordingly, normalization of a large corpus of feature vectors (or other speech units) may be accomplished during training without impacting real-time operation of a HNN/HMM system. Normalized forms of the training data set (e.g., corpus of feature vectors) can then be applied in error signals that are based on differences with corresponding, un-normalized training data. The normalization could be carried out concurrently with training operation of the adaptive auto-encoder, or at some time prior. An error signal based on the difference between the normalized feature vectors and the recovered (approximate facsimile) feature vectors could be provided as feedback to the adaptive auto-encoder during training operation. The adaptive auto-encoder could be adjusted (e.g., one or more parameters, etc.) while receiving the feedback, so as to reduce and/or minimize the error signal.

A neural network trained in this way using an adaptive auto-encoder could then perform as if it recognizes a normalized form of feature vectors, even when supplied with one or a sequence of un-normalized feature vectors. Accordingly, an ASR system employing such a "normalizing neural network" could process, in real time, speech having a range of supra-phonetic characteristics, such as varying speaker accent, pitch, and tempo, among others. Because conventional normalization of feature vectors would not necessarily need to be carried out in real time, an ASR system based on the example adaptive auto-encoder training technique could operate efficiently in real time. In this way, the example adaptive auto-encoder could compensate for supra-phonetic characteristics in a real-time input audio signal. Note that although a normalizing neural network performs as if it were normalizing input feature vectors, it may not actually be normalizing them; rather, its training via an adaptive auto-encoder has enabled it to recognize phonetic features in un-normalized feature vectors. The ability to recognize at runtime phonetic characteristics blended in with supra-phonetic characteristics would enable accurate and reliable speech recognition for a wide range of variable speech input.

2. Example Method

In example embodiments, an ASR system may include one or more processors, one or more forms of memory, one or more input devices/interfaces, one or more output devices/interfaces, and machine-readable instructions that when executed by the one or more processors cause the ASR system to carry out the various functions and tasks described herein. The ASR may include implementations of one or more hidden Markov models and a neural network, which may in turn include or be part of an auto-encoder. In particular, the functions and tasks may form a basis for a method for adaptive auto-encoders. An example of such a method is described in the current section.

FIG. 1 is a flowchart illustrating an example method in accordance with an example embodiment. At step 102 the system transforms an input audio training signal into a sequence of feature vectors. Each feature vector could include quantitative measures of acoustic properties of the input audio training signal. More specifically, the input audio training signal could be sampled in sequential temporal frames, each containing a portion of the input audio training signal digitally sampled within a sliding time window.

By way of example, the feature vectors could include Mel Filter Cepstral Coefficients (MFCC), as described below. Other possible types of quantitative measures of acoustic properties could include Perceptual Linear Predictive (PLP) coefficients, Relative Spectral (RASTA) coefficients, and Filterbank log-energy coefficients. Techniques for determining these types of quantitative measures from sampled speech are generally known. It will be appreciated that feature vectors may not necessarily be restricted to including only one of these (or other) types of quantitative measures, but could also include more than one type.

At step 104, an auto-encoder processes at least one feature vector of the sequence of feature vectors in order to generate (i) an encoded form of the quantitative measures, and (ii) a recovered form of the quantitative measures. The recovered form may be based on an inverse operation carried out by the auto-encoder on the encoded form of the quantitative measures. Thus, the encoded form of the quantitative measures may serve as input to an inverse operation of the auto-encoder, which then generates the recovered form of the quantitative measures.

At step 106, a normalizer processes a duplicate copy of the sequence of feature vectors (or a duplicate copy of the at least one feature vector processed by the auto-encoder at step 104) to generate a normalized form of the quantitative measures. In the normalized form of the quantitative measures, supra-phonetic acoustic properties of the input audio training signal may be reduced in comparison with phonetic acoustic properties of the input audio training signal. Feature vectors in which the quantitative measures have been normalized are referred to herein as "normalized feature vectors."

At step 108, an error signal based on a difference between the normalized form of the quantitative measures and the recovered form of the quantitative measures is determined. For example, the recovered form of the quantitative measures could correspond to a reference signal and the normalized form of the quantitative measures could correspond to a normalized signal. Then, error signal could be determined by subtracting the reference signal from the normalized signal.

At step 110, the error signal is provided to the auto-encoder. For example, the error signal may be provided as feedback concurrently with processing of the sequence of feature vectors.

Finally, at step 112, the auto-encoder is adjusted to reduce the magnitude of the error signal. By doing so, the auto-encoder may be trained to compensate for supra-phonetic acoustic properties of input audio signals. More particularly, the input audio signals may be distinct from the input audio training signal, and provided to the auto-encoder subsequent to training, and in the absence of an error signal. Training may enable the auto-encoder to recognize such subsequently-received input audio signals as if it was receiving a normalized form of quantitative measures of acoustic properties of the input audio signals.

Supra-phonetic acoustic properties could be indicative of particular audio characteristics such as pitch, tone, prosody, tempo, accent, and/or speaker voice quality—e.g., audio characteristics that may vary from one speaker to another. Supra-phonetic acoustic properties could also be indicative of environmental effects, such as noise, echo, echo cancellation, microphone equalization, background speaker/noise, and/or channel distortion. Accordingly, processing the duplicate copy of the sequence of feature vectors could include generating a normalized signal in which the particular audio characteristics and/or environmental effects have been reduced to less than a threshold level. Supra-phonetic acoustic properties may become part of an audio signal as a matter of uncontrolled circumstance, such as use of an ASR system by an unrestricted distribution of speakers. Additionally, certain environmental effects, such as noise, may be intentionally added to an audio signal in order to help train an auto-encoder to be able to compensate for them.

In accordance with example embodiments, generating the normalized signal could be achieved by one or another procedure for normalizing feature vectors. Such procedures include Spectral Subtraction, Vocal Tract Length Normalization, Constrained Maximum Likelihood Regression, Feature Space Maximum Likelihood Regression, Speaker Adaptive Training, Cluster Adaptive Training, and Feature Space Minimum Phone Error. It will be appreciated that there could be other procedures for normalizing features of an acoustic signal.

While the example method employs both a neural network (NN) and a normalizer, it will be appreciated that the NN and the normalizer could themselves be implemented in more than one way, and by more than one configuration of processing devices and/or platforms. For example, the NN could be implemented by a first group of one or more processors, while the normalizer could be implemented by a second group of one or more processors. Moreover, the first and second groups could be the same or different, or they could include one or more common processors. In addition, the algorithmic implementations of the NN and the normalizer could be considered part of the example method, or could be ancillary to it, being provided as separate algorithmic components, for example.

In accordance with example embodiments, the auto-encoder could be configured with a first sequential set of neural network layers adapted for forward processing of input, and a second sequential set of neural network layers adapted for inverse processing of input. The first sequential set of neural network layers may be referred to as "forward layers" or a "forward neural network," while the second sequential set of neural network layers may be referred to as "reverse layers" or an "inverse neural network." With such a configuration, processing the feature vectors with the auto-encoder (at step 10) could include forward processing the sequence of feature vectors with the forward neural network to generate the encoded form of the quantitative measures, and then inverse processing the encoded form of the quantitative measures with the inverse neural network to generate the recovered form of the quantitative measures.

In further accordance with example embodiments, training the auto-encoder to compensate for supra-phonetic features of input audio signals (at step 112) could involve adjusting the auto-encoder during training operation such that subsequently, during run-time operation, the auto-encoder can effectively recognize a normalized form of quantitative measures of acoustic properties of the input audio signals upon forward processing input feature vectors corresponding to the input audio signal. Thus, the forward neural network may be trained to recognize normalized feature vectors from input un-normalized feature vectors.

In still further accordance with example embodiments, the ability of the forward neural network to recognize a normalized form of quantitative measures of acoustic properties in input audio signals can be applied to speech recognition using hybrid neural network/hidden Markov models (HNN/HMMs). More particularly, the neural network of a HNN/HMM-based ASR system could be adaptively trained as described above. Then, during run time, a run-time sequence of feature vectors corresponding to a run-time input audio signal could be forward processed by the neural network in order to determine emission probabilities for states of the HMMs. The determined emission probabilities could then be applied to the HMMs to determine speech content corresponding to at least a portion of the run-time input audio signal. In this way, speech content may be determined from un-normalized feature vectors, without necessarily carrying out an actual normalizing procedure.

It will be appreciated that the steps shown in FIG. 1 are meant to illustrate a method in accordance with an example embodiment. As such, various steps could be altered or modified, the ordering of certain steps could be changed, and additional steps could be added, while still achieving the overall desired operation.

3. Example Communication System and Device Architecture

Methods in accordance with an example embodiment, such as the on described above, devices, could be implemented using so-called "thin clients" and "cloud-based" server devices, as well as other types of client and server devices. Under various aspects of this paradigm, client devices, such as mobile phones and tablet computers, may offload some processing and storage responsibilities to remote server devices. At least some of the time, these client services are able to communicate, via a network such as the Internet, with the server devices. As a result, applications that operate on the client devices may also have a persistent, server-based component. Nonetheless, it should be noted that at least some of the methods, processes, and techniques disclosed herein may be able to operate entirely on a client device or a server device.

This section describes general system and device architectures for such client devices and server devices. However, the methods, devices, and systems presented in the subsequent sections may operate under different paradigms as well. Thus, the embodiments of this section are merely examples of how these methods, devices, and systems can be enabled.

a. Example Communication System

Figure 2:
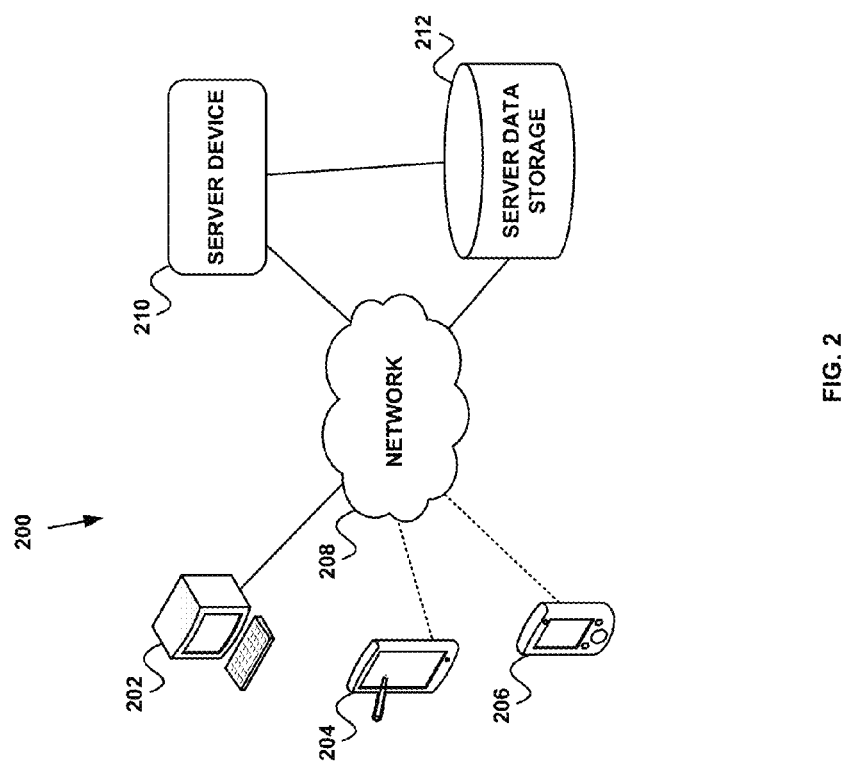
FIG. 2 is a block diagram of an example network and computing architecture, in accordance with an example embodiment.

FIG. 2 is a simplified block diagram of a communication system 200, in which various embodiments described herein can be employed. Communication system 200 includes client devices 202, 204, and 206, which represent a desktop personal computer (PC), a tablet computer, and a mobile phone, respectively. Client devices could also include wearable computing devices, such as head-mounted displays and/or augmented reality displays, for example. Each of these client devices may be able to communicate with other devices (including with each other) via a network 208 through the use of wireline connections (designated by solid lines) and/or wireless connections (designated by dashed lines).

Network 208 may be, for example, the Internet, or some other form of public or private Internet Protocol (IP) network. Thus, client devices 202, 204, and 206 may communicate using packet-switching technologies. Nonetheless, network 208 may also incorporate at least some circuit-switching technologies, and client devices 202, 204, and 206 may communicate via circuit switching alternatively or in addition to packet switching.

A server device 210 may also communicate via network 208. In particular, server device 210 may communicate with client devices 202, 204, and 206 according to one or more network protocols and/or application-level protocols to facilitate the use of network-based or cloud-based computing on these client devices. Server device 210 may include integrated data storage (e.g., memory, disk drives, etc.) and may also be able to access a separate server data storage 212. Communication between server device 210 and server data storage 212 may be direct, via network 208, or both direct and via network 208 as illustrated in FIG. 2. Server data storage 212 may store application data that is used to facilitate the operations of applications performed by client devices 202, 204, and 206 and server device 210.

Although only three client devices, one server device, and one server data storage are shown in FIG. 2, communication system 200 may include any number of each of these components. For instance, communication system 200 may comprise millions of client devices, thousands of server devices and/or thousands of server data storages. Furthermore, client devices may take on forms other than those in FIG. 2.

b. Example Server Device and Server System

Figure 3A:
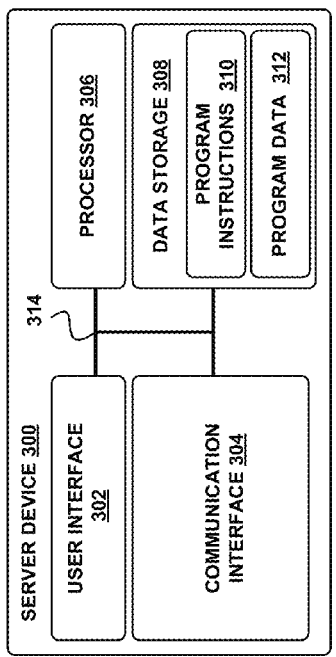
FIG. 3A is a block diagram of a server device, in accordance with an example embodiment.

FIG. 3A is a block diagram of a server device in accordance with an example embodiment. In particular, server device 300 shown in FIG. 3A can be configured to perform one or more functions of server device 210 and/or server data storage 212. Server device 300 may include a user interface 302, a communication interface 304, processor 306, and data storage 308, all of which may be linked together via a system bus, network, or other connection mechanism 314.

User interface 302 may comprise user input devices such as a keyboard, a keypad, a touch screen, a computer mouse, a track ball, a joystick, and/or other similar devices, now known or later developed. User interface 302 may also comprise user display devices, such as one or more cathode ray tubes (CRT), liquid crystal displays (LCD), light emitting diodes (LEDs), displays using digital light processing (DLP) technology, printers, light bulbs, and/or other similar devices, now known or later developed. Additionally, user interface 302 may be configured to generate audible output(s), via a speaker, speaker jack, audio output port, audio output device, earphones, and/or other similar devices, now known or later developed. In some embodiments, user interface 302 may include software, circuitry, or another form of logic that can transmit data to and/or receive data from external user input/output devices.

Communication interface 304 may include one or more wireless interfaces and/or wireline interfaces that are configurable to communicate via a network, such as network 208 shown in FIG. 2. The wireless interfaces, if present, may include one or more wireless transceivers, such as a BLUETOOTH® transceiver, a Wifi transceiver perhaps operating in accordance with an IEEE 802.11 standard (e.g., 802.11b, 802.11g, 802.11n), a WiMAX transceiver perhaps operating in accordance with an IEEE 802.16 standard, a Long-Term Evolution (LTE) transceiver perhaps operating in accordance with a 3rd Generation Partnership Project (3GPP) standard, and/or other types of wireless transceivers configurable to communicate via local-area or wide-area wireless networks. The wireline interfaces, if present, may include one or more wireline transceivers, such as an Ethernet transceiver, a Universal Serial Bus (USB) transceiver, or similar transceiver configurable to communicate via a twisted pair wire, a coaxial cable, a fiber-optic link or other physical connection to a wireline device or network.

In some embodiments, communication interface 304 may be configured to provide reliable, secured, and/or authenticated communications. For each communication described herein, information for ensuring reliable communications (e.g., guaranteed message delivery) can be provided, perhaps as part of a message header and/or footer (e.g., packet/message sequencing information, encapsulation header(s) and/or footer(s), size/time information, and transmission verification information such as cyclic redundancy check (CRC) and/or parity check values). Communications can be made secure (e.g., be encoded or encrypted) and/or decrypted/decoded using one or more cryptographic protocols and/or algorithms, such as, but not limited to, the data encryption standard (DES), the advanced encryption standard (AES), the Rivest, Shamir, and Adleman (RSA) algorithm, the Diffie-Hellman algorithm, and/or the Digital Signature Algorithm (DSA). Other cryptographic protocols and/or algorithms may be used instead of or in addition to those listed herein to secure (and then decrypt/decode) communications.

Processor 306 may include one or more general purpose processors (e.g., microprocessors) and/or one or more special purpose processors (e.g., digital signal processors (DSPs), graphical processing units (GPUs), floating point processing units (FPUs), network processors, or application specific integrated circuits (ASICs)). Processor 306 may be configured to execute computer-readable program instructions 310 that are contained in data storage 308, and/or other instructions, to carry out various functions described herein.

Data storage 308 may include one or more non-transitory computer-readable storage media that can be read or accessed by processor 306. The one or more computer-readable storage media may include volatile and/or non-volatile storage components, such as optical, magnetic, organic or other memory or disc storage, which can be integrated in whole or in part with processor 306. In some embodiments, data storage 308 may be implemented using a single physical device (e.g., one optical, magnetic, organic or other memory or disc storage unit), while in other embodiments, data storage 308 may be implemented using two or more physical devices.

Data storage 308 may also include program data 312 that can be used by processor 306 to carry out functions described herein. In some embodiments, data storage 308 may include, or have access to, additional data storage components or devices (e.g., cluster data storages described below).

Referring again briefly to FIG. 2, server device 210 and server data storage device 212 may store applications and application data at one or more locales accessible via network 208. These locales may be data centers containing numerous servers and storage devices. The exact physical location, connectivity, and configuration of server device 210 and server data storage device 212 may be unknown and/or unimportant to client devices. Accordingly, server device 210 and server data storage device 212 may be referred to as "cloud-based" devices that are housed at various remote locations. One possible advantage of such "cloud-based" computing is to offload processing and data storage from client devices, thereby simplifying the design and requirements of these client devices.

In some embodiments, server device 210 and server data storage device 212 may be a single computing device residing in a single data center. In other embodiments, server device 210 and server data storage device 212 may include multiple computing devices in a data center, or even multiple computing devices in multiple data centers, where the data centers are located in diverse geographic locations. For example, FIG. 2 depicts each of server device 210 and server data storage device 212 potentially residing in a different physical location.

Figure 3B:
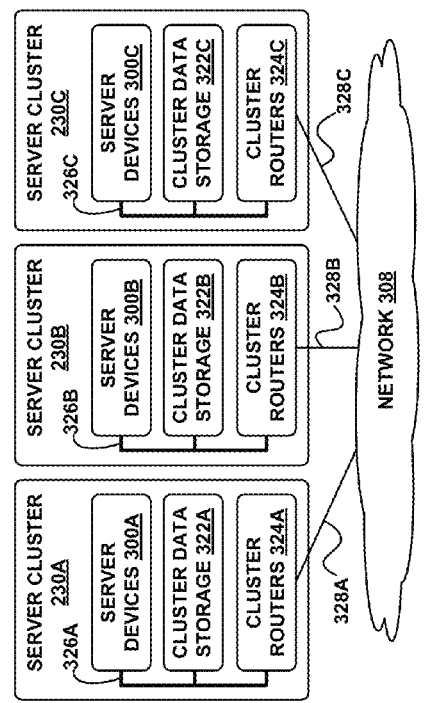
FIG. 3B depicts a cloud-based server system, in accordance with an example embodiment.

FIG. 3B depicts an example of a cloud-based server cluster. In FIG. 3B, functions of server device 210 and server data storage device 212 may be distributed among three server clusters 320A, 320B, and 320C. Server cluster 320A may include one or more server devices 300A, cluster data storage 322A, and cluster routers 324A connected by a local cluster network 326A. Similarly, server cluster 320B may include one or more server devices 300B, cluster data storage 322B, and cluster routers 324B connected by a local cluster network 326B. Likewise, server cluster 320C may include one or more server devices 300C, cluster data storage 322C, and cluster routers 324C connected by a local cluster network 326C.

Server clusters 320A, 320B, and 320C may communicate with network 308 via communication links 328A, 328B, and 328C, respectively.

In some embodiments, each of the server clusters 320A, 320B, and 320C may have an equal number of server devices, an equal number of cluster data storages, and an equal number of cluster routers. In other embodiments, however, some or all of the server clusters 320A, 320B, and 320C may have different numbers of server devices, different numbers of cluster data storages, and/or different numbers of cluster routers. The number of server devices, cluster data storages, and cluster routers in each server cluster may depend on the computing task(s) and/or applications assigned to each server cluster.

In the server cluster 320A, for example, server devices 300A can be configured to perform various computing tasks of a server, such as server device 210. In one embodiment, these computing tasks can be distributed among one or more of server devices 300A. Server devices 300B and 300C in server clusters 320B and 320C may be configured the same or similarly to server devices 300A in server cluster 320A. On the other hand, in some embodiments, server devices 300A, 300B, and 300C each may be configured to perform different functions. For example, server devices 300A may be configured to perform one or more functions of server device 210, and server devices 300B and server device 300C may be configured to perform functions of one or more other server devices. Similarly, the functions of server data storage device 212 can be dedicated to a single server cluster, or spread across multiple server clusters.

Cluster data storages 322A, 322B, and 322C of the server clusters 320A, 320B, and 320C, respectively, may be data storage arrays that include disk array controllers configured to manage read and write access to groups of hard disk drives. The disk array controllers, alone or in conjunction with their respective server devices, may also be configured to manage backup or redundant copies of the data stored in cluster data storages to protect against disk drive failures or other types of failures that prevent one or more server devices from accessing one or more cluster data storages.

Similar to the manner in which the functions of server device 210 and server data storage device 212 can be distributed across server clusters 320A, 320B, and 320C, various active portions and/or backup/redundant portions of these components can be distributed across cluster data storages 322A, 322B, and 322C. For example, some cluster data storages 322A, 322B, and 322C may be configured to store backup versions of data stored in other cluster data storages 322A, 322B, and 322C.

Cluster routers 324A, 324B, and 324C in server clusters 320A, 320B, and 320C, respectively, may include networking equipment configured to provide internal and external communications for the server clusters. For example, cluster routers 324A in server cluster 320A may include one or more packet-switching and/or routing devices configured to provide (i) network communications between server devices 300A and cluster data storage 322A via cluster network 326A, and/or (ii) network communications between the server cluster 320A and other devices via communication link 328A to network 308. Cluster routers 324B and 324C may include network equipment similar to cluster routers 324A, and cluster routers 324B and 324C may perform networking functions for server clusters 320B and 320C that cluster routers 324A perform for server cluster 320A.

Additionally, the configuration of cluster routers 324A, 324B, and 324C can be based at least in part on the data communication requirements of the server devices and cluster storage arrays, the data communications capabilities of the network equipment in the cluster routers 324A, 324B, and 324C, the latency and throughput of the local cluster networks 326A, 326B, 326C, the latency, throughput, and cost of the wide area network connections 328A, 328B, and 328C, and/or other factors that may contribute to the cost, speed, fault-tolerance, resiliency, efficiency and/or other design goals of the system architecture.

c. Example Client Device

Figure 4:
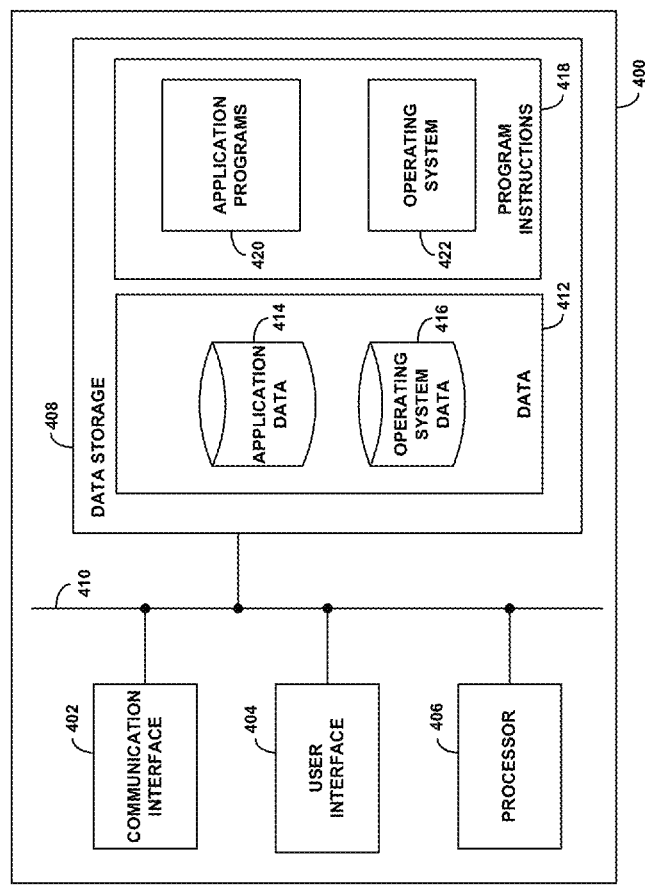
FIG. 4 depicts a block diagram of a client device, in accordance with an example embodiment.

FIG. 4 is a simplified block diagram showing some of the components of an example client device 400. By way of example and without limitation, client device 400 may be or include a "plain old telephone system" (POTS) telephone, a cellular mobile telephone, a still camera, a video camera, a fax machine, an answering machine, a computer (such as a desktop, notebook, or tablet computer), a personal digital assistant (PDA), a wearable computing device, a home automation component, a digital video recorder (DVR), a digital TV, a remote control, or some other type of device equipped with one or more wireless or wired communication interfaces.

As shown in FIG. 4, client device 400 may include a communication interface 402, a user interface 404, a processor 406, and data storage 408, all of which may be communicatively linked together by a system bus, network, or other connection mechanism 410.

Communication interface 402 functions to allow client device 400 to communicate, using analog or digital modulation, with other devices, access networks, and/or transport networks. Thus, communication interface 402 may facilitate circuit-switched and/or packet-switched communication, such as POTS communication and/or IP or other packetized communication. For instance, communication interface 402 may include a chipset and antenna arranged for wireless communication with a radio access network or an access point. Also, communication interface 402 may take the form of a wireline interface, such as an Ethernet, Token Ring, or USB port. Communication interface 402 may also take the form of a wireless interface, such as a Wifi, BLUETOOTH®, global positioning system (GPS), or wide-area wireless interface (e.g., WiMAX or LTE). However, other forms of physical layer interfaces and other types of standard or proprietary communication protocols may be used over communication interface 402. Furthermore, communication interface 402 may comprise multiple physical communication interfaces (e.g., a Wifi interface, a BLUETOOTH® interface, and a wide-area wireless interface).

User interface 404 may function to allow client device 400 to interact with a human or non-human user, such as to receive input from a user and to provide output to the user. Thus, user interface 404 may include input components such as a keypad, keyboard, touch-sensitive or presence-sensitive panel, computer mouse, trackball, joystick, microphone, still camera and/or video camera. User interface 404 may also include one or more output components such as a display screen (which, for example, may be combined with a touch-sensitive panel), CRT, LCD, LED, a display using DLP technology, printer, light bulb, and/or other similar devices, now known or later developed. User interface 404 may also be configured to generate audible output(s), via a speaker, speaker jack, audio output port, audio output device, earphones, and/or other similar devices, now known or later developed. In some embodiments, user interface 404 may include software, circuitry, or another form of logic that can transmit data to and/or receive data from external user input/output devices. Additionally or alternatively, client device 400 may support remote access from another device, via communication interface 402 or via another physical interface (not shown).

Processor 406 may comprise one or more general purpose processors (e.g., microprocessors) and/or one or more special purpose processors (e.g., DSPs, GPUs, FPUs, network processors, or ASICs). Data storage 408 may include one or more volatile and/or non-volatile storage components, such as magnetic, optical, flash, or organic storage, and may be integrated in whole or in part with processor 406. Data storage 408 may include removable and/or non-removable components.

In general, processor 406 may be capable of executing program instructions 418 (e.g., compiled or non-compiled program logic and/or machine code) stored in data storage 408 to carry out the various functions described herein. Therefore, data storage 408 may include a non-transitory computer-readable medium, having stored thereon program instructions that, upon execution by client device 400, cause client device 400 to carry out any of the methods, processes, or functions disclosed in this specification and/or the accompanying drawings. The execution of program instructions 418 by processor 406 may result in processor 406 using data 412.

By way of example, program instructions 418 may include an operating system 422 (e.g., an operating system kernel, device driver(s), and/or other modules) and one or more application programs 420 (e.g., address book, email, web browsing, social networking, and/or gaming applications) installed on client device 400. Similarly, data 412 may include operating system data 416 and application data 414. Operating system data 416 may be accessible primarily to operating system 422, and application data 414 may be accessible primarily to one or more of application programs 420. Application data 414 may be arranged in a file system that is visible to or hidden from a user of client device 400.

Application programs 420 may communicate with operating system 412 through one or more application programming interfaces (APIs). These APIs may facilitate, for instance, application programs 420 reading and/or writing application data 414, transmitting or receiving information via communication interface 402, receiving or displaying information on user interface 404, and so on.

In some vernaculars, application programs 420 may be referred to as "apps" for short. Additionally, application programs 420 may be downloadable to client device 400 through one or more online application stores or application markets. However, application programs can also be installed on client device 400 in other ways, such as via a web browser or through a physical interface (e.g., a USB port) on client device 400.

4. Example System and Operation a. Example Automatic Speech Recognition System

Figure 5:
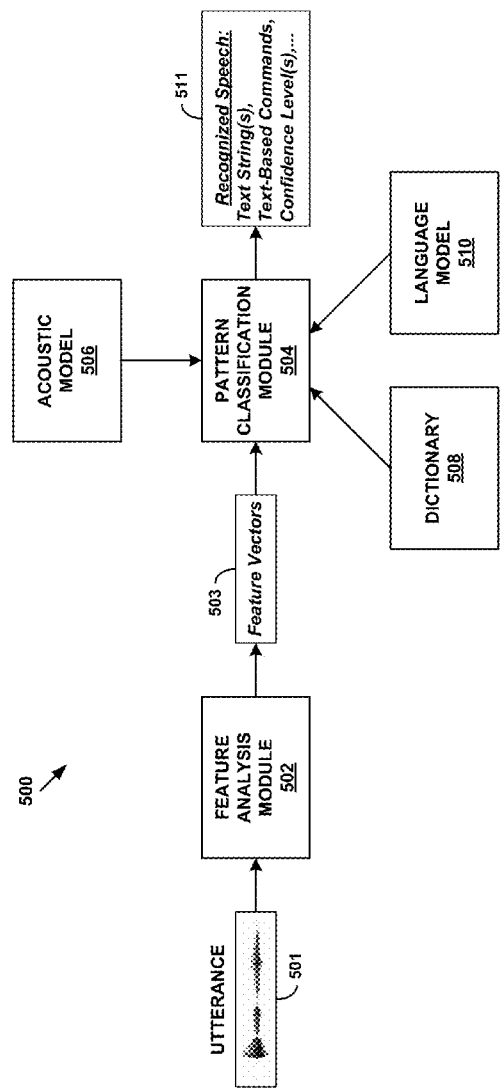
FIG. 5 depicts a block diagram of an ASR system, in accordance with an example embodiment.

FIG. 5 depicts a block diagram of an example ASR system 500 in which an example embodiment of direct-context prediction could be carried out. In addition to functional components, FIG. 5 also shows selected example inputs, outputs, and intermediate products of example operation. The functional components of the ASR system 500 include a feature analysis module 502, a pattern classification module 504, an acoustic model 506, a dictionary 508, and a language model 510. These functional components could be implemented as machine-language instructions in a centralized and/or distributed fashion on one or more computing platforms or systems, such as those described above. The machine-language instructions could be stored in one or another form of a tangible, non-transitory computer-readable medium (or other article of manufacture), such as magnetic or optical disk, or the like, and made available to processing elements of the system as part of a manufacturing procedure, configuration procedure, and/or execution start-up procedure, for example.

It should be noted that the discussion in this section, and the accompanying figures, are presented for purposes of example. Other ASR system arrangements, including different components, different relationships between the components, and/or different processing, may be possible.

At run-time, an audio signal bearing an utterance 501 may be input to the ASR system 500, whereupon the system may generate an output 511 that could include recognized speech in the form of one or more text strings and possibly associated confidence levels. The output could also take the form of a computer-executable action or command identified or associated with the recognized speech (or other audio) content of the input utterance 501.

In some examples, the utterance 501 could include an analog or digital representation of human speech, such as a spoken word, multiple words, a phrase, multiple phrases, a sentence, multiple sentences, or other segment of speech, for example. Although not explicitly shown in the figure, the source of the utterance 501 could be a live person speaking in real time into a microphone, telephone, or other audio input/transmission device/system, that then produces and supplies the audio signal as input to the ASR system 500. The audio input/transmission device/system, also not explicitly shown in FIG. 5, could, by way of example, be a client device, such as the ones described above. Additionally or alternatively, an audio input/transmission device/system could be integrated as part of the ASR system 500. The source of the spoken utterance could also be previously-recorded speech that is played out via an audio output device/system, for example, and supplied as the audio input signal to the ASR system.

As shown in the FIG. 5, the utterance 501 may be received at the analysis module 502, which may convert utterance 501 into a sequence of one or more feature vectors 503. The conversion of the utterance 501 into the feature vectors 503 is sometimes referred to as feature extraction. As described below, each of feature vectors 503 may include temporal and/or spectral representations of the acoustic features of at least a portion of utterance 501.

Following feature extraction, the feature vectors 503 may be input to the pattern classification module 504, which may produce the output 511. By way of example, the output 511 could be one or more text string transcriptions of utterance 501. Each transcription 33 may be accompanied by a respective confidence level indicating an estimated likelihood that the transcription is correct (e.g., 80% confidence, 90% confidence, etc.). The output 511 could also take the form of an executable application or command determined based on the recognize speech content of the utterance 501.

To produce the output 511, pattern classification module 504 may bring together and/or incorporate functionality of the acoustic model 506, the dictionary 508, and the language model 510. The acoustic model 506 is used to model the observed data, as represented in the feature vectors 503, subject to guidance and constraints supplied by the dictionary 508 and the language model 510. The modeling process determines probabilities that a particular sequence of feature vectors 503 were derived from particular sequences of spoken sub-word sounds. Modeling may also involve probabilistic mapping of sequences of feature vectors to one or more fundamental speech units (e.g., phonemes) from among a stored corpus of fundamental speech units. The acoustic model 506 is discussed in more detail below.

In a manner similar to that of the acoustic model 506, the language model 510 may assign probabilities to sequences of phonemes or words, based on the likelihood of a sequence of phonemes or words occurring in an input utterance to the ASR system. Thus, for example, language model 510 may define the conditional probability of $w_n$ (the nth word in a phrase transcribed from an utterance), given the values of the pattern of n−1 previous words in the phrase. This conditional probability can be expressed formally as $P(w_n|w_1, w_2, \ldots, w_{n-1})$.

Consideration of certain aspects of the example ASR system 500 in more detail may be useful to further understanding example embodiments. In practice, the feature analysis module 502 may sample and quantize utterance 501 within a time sequence of overlapping or non-overlapping temporal frames, and perform spectral analysis on the frames to derive a feature vector associated with each frame. For example, each frame could be acquired in a sliding time window that is periodically advanced. Each advance of the time window could be in increments measured in fractional units of the width of the time window. By way of example, the width of each frame (and of the sliding time window) could be 25 milliseconds (ms), and the time increment between each frame acquisition could be 10 ms. With this configuration, each new 25 ms frame would advance by 10 ms past the end of the previous frame, and the first 15 ms of each new 25 ms frame would overlap with the last 15 ms of the previous frame. Thus, every two consecutive frames would contain 15 ms of common audio data (e.g. of an utterance). Other frame sizes, window sizes, and time increment sizes could be used as well.

Feature extraction produces a feature vector for each frame of sampled audio data (e.g. of the utterance 501). By way of example, each feature vector may include Mel Filter Cepstral Coefficients (MFCCs) of each frame of the utterance 501, as determined by the feature analysis module 502. MFCCs may represent the short-term power spectrum of a portion of utterance 501, and may be based on, for example, a linear cosine transform of a log power spectrum on a nonlinear Mel scale of frequency. (A Mel scale may be a scale of pitches subjectively perceived by listeners to be about equally distant from one another, even though the actual frequencies of these pitches are not equally distant from one another.) The feature analysis module 502 may further perform noise removal and convert the standard spectral coefficients to MFCCs, and then calculate first-order and second-order cepstral derivatives of the MFCCs.

The first-order cepstral coefficient derivatives may be calculated based on the slopes of linear regressions performed over windows of two or more consecutive frames. The second-order cepstral coefficient derivatives may be calculated based on the slopes of linear regressions performed over windows of two or more consecutive sets of first-order cepstral coefficient derivatives. However, there may be other ways of calculating the first-order and second-order cepstral coefficient derivatives.

In some embodiments, one or more frames of utterance 501 may be represented by a feature vector of MFCCs, first-order cepstral coefficient derivatives, and second-order cepstral coefficient derivatives. For example, the feature vector may contain 13 coefficients, 13 first-order derivatives, and 13 second-order derivatives, therefore having a length of 39. However, feature vectors may use different combinations of features in other possible embodiments. As another example, feature vectors could include Perceptual Linear Predictive (PLP) coefficients, Relative Spectral (RASTA) coefficients, Filterbank log-energy coefficients, or some combination thereof. Each feature vector may be thought of as including a quantified characterization of the acoustic content of a corresponding temporal frame of the utterance 501 (or more generally of an audio input signal).

The corpus applied in the modeling procedure may include a large collection of stored speech samples that have been digitally processed, deconstructed, and categorized into a set of fundamental units corresponding to speech sounds, such as phonemes. The corpus may also include a set of units corresponding to larger speech segments (e.g., words, phrases, etc.). The fundamental units may also have associated "tags" or labels that can be used to identify them for purposes of generating text or other output from strings or sequences of units, for example.

As discussed above, a fundamental unit of speech that is suitable for use in the modeling procedure is a phoneme. A phoneme may be considered to be the smallest segment of an utterance that encompasses a meaningful contrast with other segments of utterances. Thus, a word typically includes one or more phonemes. For purposes of simplicity, phonemes may be thought of as utterances of letters, although this is not a perfect analogy, as some phonemes may present multiple letters. As an example, the phonemic spelling for the American English pronunciation of the word "cat" is /k/ /ae/ /t/, and consists of the phonemes /k/, /ae/, and /t/. Another example is the phonemic spelling for the word "dog" is /d/ /aw/ /g/, consisting of the phonemes /d/, /aw/, and /g/. Different phonemic alphabets exist, and other phonemic representations are possible. Common phonemic alphabets for American English contain about 40 distinct phonemes. Each of these phonemes can be represented in a quantifiable form as a distribution of feature vector values.

In the context of typical speech, a given phoneme may occur in (or be analyzed in) the context of one or more other preceding and/or following phonemes. For example, phonemes occurring in triplet combinations are referred to as triphones, whereby a given phoneme appears in the context of a preceding phoneme and a following (subsequent) phoneme. By convention, the preceding phoneme is called the "left context" and the following (subsequent) phoneme is called the "right context." Thus, the ordering of the phonemes of a triphone corresponds to the direction in which English is read.

Triphones capture how acoustic properties of a phoneme can depend on what precedes and follows it in a particular, spoken word. As an example, the word "dad" when spoken could be considered to be constructed of phoneme sequence [d], [ae], and [d], where the brackets ("[ ]") identify the particular phoneme being spoken, and the forward-slash ("/") notation has been dropped for the sake of brevity. In isolation (or following a pause after a preceding word, for example), the first triphone of "dad" would be "#[d]ae." The left-context phoneme "#" signifies the start of the first [d] phoneme with nothing (e.g., a pause) preceding it (e.g., silence), and the right-context phoneme "ae" signifies the a-sound (as in "dad") following it. Both the left and right contexts influence how the [d] phoneme is rendered acoustically. The next triphone would be "d[ae]d," in which the acoustic properties of the [ae] phoneme are influenced by the both the left-context (preceding) phoneme "d" and the right-context (following) phoneme "d." Finally, the last triphone would be "ae[d]#," in which the acoustic properties of the final [d] phoneme are influenced by the both the left-context (preceding) phoneme "ae" and the right-context (following) phoneme "#" that signifies the end of the word (e.g., no further sound).

b. Example Hybrid Neural Network/Hidden Markov Model Implementation

In accordance with example embodiments, the acoustic model 506 may be implemented in the form of, or may include, a hybrid configuration of a neural network (NN) and one or more hidden Markov models (HMMs). Such an implementation is referred to herein as a hybrid neural network/hidden Markov model, and is abbreviated as HNN/HMM (or HNN/HMMs in reference to a plural HMMs). In a HNN/

HMM implementation, one or more HMMs are used to model the fundamental speech units (e.g., phonemes, triphones, etc.), while the neural network is used to determine certain probabilities to apply to the models, based on the observed data (i.e., sequence of feature vectors 503 in the example ASR system 500). For purposes of the discussion herein, the fundamental speech units of HMMs will be taken to be triphones, since this is the case in practice for certain ASR systems. It will be appreciated, however, that the principles discussed is not limited to triphones, and that other fundamental speech units can be used (e.g. phonemes, quinphones, etc.).

As a spoken sound, a triphone may be modeled as temporally evolving according to a sequence of temporal phases. It has been observed empirically, for example, that triphones manifest in speech across three acoustic phases: a start, a middle, and an end. The HMM for a given triphone therefore can be constructed having three states, one corresponding to each acoustic phase. Transitions between states are governed by transition probabilities of the model, and one or more states could include self-transitions that "loop" back to themselves. In addition, each state has an associated "emission probability" for "emitting" an output corresponding to the acoustic phase of the triphone. Thus, the HMM for a given triphone is characterized by probabilities of transitioning from a current state to a next state, and upon transitioning, a respective probability of producing (emitting) the acoustic phase associated with the next state. As described below, the emission probabilities are determined by the neural network, based on the observed utterance as represented in the feature vectors derived from the utterance.

Returning first to the example of the word "dad," the triphone sequence described above could be modeled with three HMM states each. For example, the triphone "#[d]ae" could be modeled according to states corresponding to "#[d]ae.1," "#[d]ae.2," and "#[d]ae.3," where the ".1," ".2," and ".3" signify a temporal order of the states in the HMM for the triphone "#[d]ae." Similarly, the triphone "d[ae]d" could be modeled with a HMM having states corresponding to "d[ae]d.1," "d[ae]d.2," and "d[ae]d.3," and the triphone "ae[d]#" could be modeled with a HMM having states corresponding to "ae[d]#.1," "ae[d]#.2," "ae[d]#.3." This description could be generalized to different number of acoustic phases of triphones (as well as to other phoneme sequences).

Sequential feature vectors 503 derived from the utterance 501 represent a stream of observed acoustic data, while sequential states of one or more concatenated HMMs represent sequences of acoustic phases of triphones in the corpus that probabilistically correspond to the observed acoustic data. While the possible states and their associated transition and emission probabilities of the HMMs may be known, the specific state sequences associated with any given observed sequence of feature vectors is not a priori known (hence the term "hidden"). Recognition of speech in the input utterance 501 therefore involves determining the most probable sequence (or sequences) of states of one or more concatenated HMMs that would produce the observed feature vectors 503. The most probable sequence of states then corresponds to the most probable sequence of triphones (including acoustic phases), from which the output 511 can be determined.

In a HNN/HMM implementation, the determination of the most probable sequences of HMMs and states is carried out one step at a time, where each step corresponds to a feature vector in the sequence 503, and by extension to a frame of sampled audio data. The process can be guided at each new step by the results of the previous step, since the most probable state determined for the previous step may constrain the possible (allowed) states that can be transitioned to on the next step. Thus, for each particular feature vector and each allowed next state, the NN determines a conditional probability that the particular feature vector would be emitted given the allowed next state.

More particularly, the NN may be trained before run time to recognize feature vectors as input, and to generate associated conditional probabilities as output. Then, at each time step corresponding to a frame at run time, the NN, based on what it has "learned" during training, generates a posterior conditional probability of being in the particular allowed next state, given the observed run-time feature vector. On the other hand, the emission probability for each particular allowed next state is a prior conditional probability of emitting the observed feature vector, given that the HMM is in the particular allowed next state. The prior conditional probability—i.e., the emission probability—can be related to the posterior conditional probability through Bayes rule.

In specific terms, the NN may be trained to be able to produce, at run time, the posterior conditional probability $p(q_k|x_j)$, corresponding to the a posteriori probability of the HMM state $q_k$ given the acoustic data $x_j$, observed at run time. The index k=1, . . . , K runs over K allowed next states of concatenated HMMs, while the $x_j$, j=1, . . . , S may be taken as a feature vector having S acoustic features. As noted, the training of the NN may take place before run time, using training data (e.g., from the corpus). For the HMM states, Bayes rule can be expressed as:

$$\frac{p(x_j|q_k)}{p(x_j)} = \frac{p(q_k|x_j)}{p(q_k)}, \quad [1]$$

where $p(q_k)$ gives the prior probabilities for the $q_k$ states, and $p(x_j)$ gives the probabilities for the acoustic features. Before run time, the ASR system may also be trained to generate expected output (e.g., text strings) from known input speech (e.g., utterances), from which relative frequencies of the $q_k$, k=1, . . . , K states, and correspondingly the prior probabilities $p(q_k)$ for the $q_k$ states may be determined. In addition, the probabilities $p(x_j)$ are the same for all states at run time, and so may be treated as a scaling constant in the expression for Bayes rule. It may therefore be seen that the a priori emission probabilities $p(x_j|q_k)$ for the $q_k$, k=1, . . . , K states follow from Bayes rule (equation [1] above) applied at run time for the HMM states.

Once the emission probabilities for all the allowed next states of a time step are computed, the most probable next state for that time step can be determined as the one that maximizes the combined likelihood of being transitioned to, and emitting the observed feature vector. In this manner, the most probable sequence of states corresponding to a sequence of feature vectors is determined, and from which follows the most probable sequence of fundamental speech units in the corpus and a reconstruction of the utterance in the audio input signal.

One of the aspects of using a neural network for determining the emission probabilities is that correlations among feature vectors are accounted for naturally in the "learning" process during training Consequently, categorization of feature vectors corresponding to the speech samples of the corpus can avoid simplifying assumptions often required by other analysis techniques, such as Gaussian mixture models, to deal with statistical complexities. Moreover, the ability of neural networks to naturally account for correlations among feature vectors also enables determination of the probabilities for a given input feature vector to include input from a subsequence of feature vectors preceding and/or following the given feature vector. Feature vectors preceding and/or following a given feature vector can thereby provide additional context for the neural network.

Figure 6:
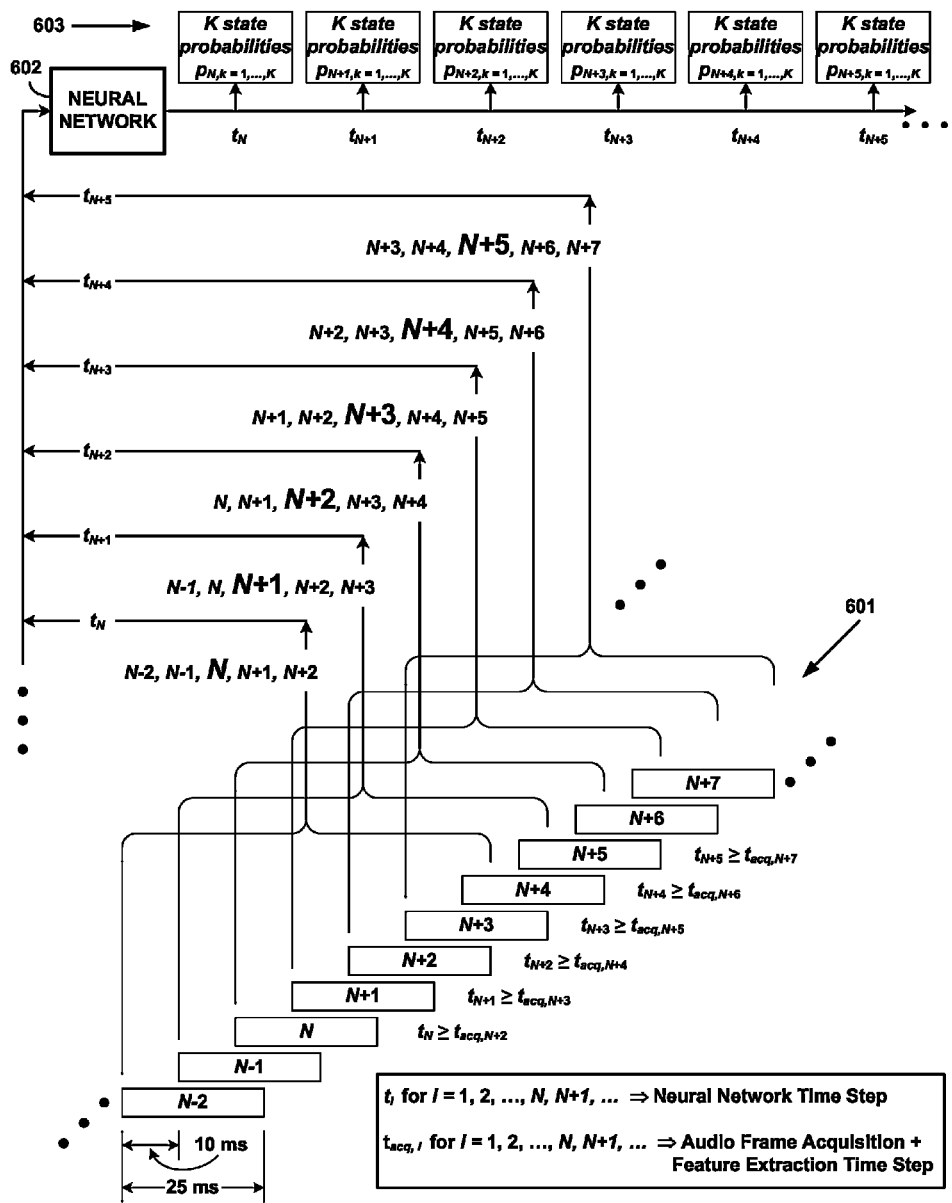
FIG. 6 is a schematic illustration of processing of feature vectors with a neural network to determine emission probabilities for hidden Markov models.

FIG. 6 is a schematic illustration of processing of feature vectors with a neural network to determine emission probabilities for hidden Markov models. In the figure, a time sequence of feature vectors 601 is represented by a "staircase" of overlapping rectangles labeled, by way of example, N−2, N−1, . . . , N, N+1, . . . , N+7, where each label corresponds to a frame time step at which the input audio data was acquired (e.g., digitally sampled). The representation of the feature vectors 601 as overlapping rectangles is meant as an indication that each feature vector corresponds to a frame of sampled audio input (e.g., an utterance), and that each frame may be acquired in a sliding time window. As illustrated by way of example in FIG. 6, each frame (i.e., the time window) is 25 ms in duration, and the time increment between successive windows is 10 ms. With this configuration, each next frame overlaps the previous frame by 15 ms. The time increment between frames (e.g., 10 ms in the present example) can be referred to as the frame period; the inverse of the frame period can be referred as the frame rate (100 frames per second in the present example).

The feature vectors 601 in FIG. 6 may be the output of sampling and digital processing, such as by the feature analysis module 502 shown in FIG. 5. The frame-like representation of the feature vectors 601 may thus be taken as a visual cue that digital samples of the input utterance 501 may be acquired in time frames using a sliding window, and then subject to feature extraction. In the example operation illustrated in FIG. 6, each frame of audio data may be acquired (e.g., digitally sampled) at an "acquisition time" $t_{ack,i}$, i=1, 2, . . . , N, N+1, . . . . For purposes of the present discussion, $t_{ack,i}$ may also be considered the time at which feature extraction is performed, although this is not necessarily a restriction of embodiments described herein.

Each feature vector of the sequence 601 may then be presented as input to a neural network 602 for processing at a respective "neural network time step" $t_i$, i=1, 2, . . . , N, N+1, . . . . Note that the $t_i$ may not necessarily be equal to $t_{ack,i}$ for a given value of i=N. As explained below, for example, the input to the neural network 602 at $t_{i=N}$ may include a feature vector corresponding to a frame acquired at $t_{ack,i-N}$, as well as one or more feature vectors corresponding to frames acquired at times after (and possibly before) $t_{ack,i-N}$. In this case, $t_{i-N} \geq t_{ack,i-N+m}$, where m is the number of additional feature vectors (and frames) following frame N. For the illustration in FIG. 6, each feature vector input to the neural network 602 includes feature vectors corresponding to two subsequent (and two preceding) frames; hence $t_{i-N} \geq t_{ack,i-N+2}$ for each value of N, as indicated for this example. The legend at lower right of FIG. 6 reiterates the meanings of $t_i$ and $t_{ack,i}$.

By way of example in FIG. 6, feature vectors corresponding to frame times $t_{ack,N}, t_{ack,N+1}, \ldots, t_{ack,N+5}$ (and labeled N, N+1, . . . , N+5) are shown at being input to the neural network at neural network time steps $t_N, t_{N+1}, \ldots, t_{N+5}$. At each neural network time step, each feature vector is shown as being "accompanied" by two preceding and two following feature vectors corresponding to preceding and following frame acquisition times.

For example, the input to the neural network 602 at neural network time step $t_N$ includes the feature vector labeled N, together with feature vectors labeled N−2, N−1, N+1, and N+2, corresponding to frame acquisition times $t_{ack,N-2}$, $t_{ack,N-1}, t_{ack,N}, t_{ack,N+1}$, and $t_{ack,N+2}$. Similarly, the input to the neural network 602 at neural network time step $t_{N+1}$ includes the feature vector labeled N+1, together with feature vectors labeled N−1, N, N+2, and N+3, corresponding to frame acquisition times $t_{ack,N-1}, t_{ack,N}, t_{ack,N+1}, t_{ack,N+2}$, and $t_{ack,N+3}$. This pattern in extended in the figure up to neural network time step $t_{N+5}$ for the feature vector labeled N+5, together with feature vectors labeled N+3, N+4, N+6, and N+7, corresponding to frame acquisition times $t_{ack,N+3}, t_{ack,N+4}, t_{ack,N+5}, t_{ack,N+6}$, and $t_{ack,N+7}$. It will be appreciated that other arrangements of multiple feature vector input could be used. For instance, each feature vector could be accompanied by four preceding and four following feature vectors. In addition, the number of preceding and following feature vectors need not be equal.

In a HNN/HMM implementation, the neural network 602 may generate at each neural network time step $t_i$, i=1, 2, . . . , N, N+1, . . . , a set of K emission probabilities $p(x_j|q_k)$ for $q_k$, k=1, . . . , K HMM states according, for example, to equation [1]. As such, the neural network 602 may be considered as operating at the input frame rate. In FIG. 6, for example, a set of K emission probabilities 603 is generated at each of neural network time steps $t_N, t_{N+1}, t_{N+2}, t_{N+3}, t_{N+4}$, and $t_{N+5}$. The emission probabilities 603, designated "K state probabilities" in this example, are labeled $p_{N,k=1, \ldots, K}$ at $t_N$; $p_{N+1,k=1, \ldots, K}$ at $t_{N+1}$; $p_{N+2,k=1, \ldots, K}$ at $t_{N+2}$; $p_{N+3,k=1, \ldots, K}$ at $t_{N+3}$; $p_{N+4,k=1, \ldots, K}$ at $t_{N+4}$; and $p_{N+5,k=1, \ldots, K}$ at $t_{N+5}$. Thus, although multiple feature vectors are presented as input to the neural network 602 at each neural network time step, the output set of emission probabilities may apply to the HMM states at just one frame time, corresponding to just one frame of input audio data.

Figure 7A:
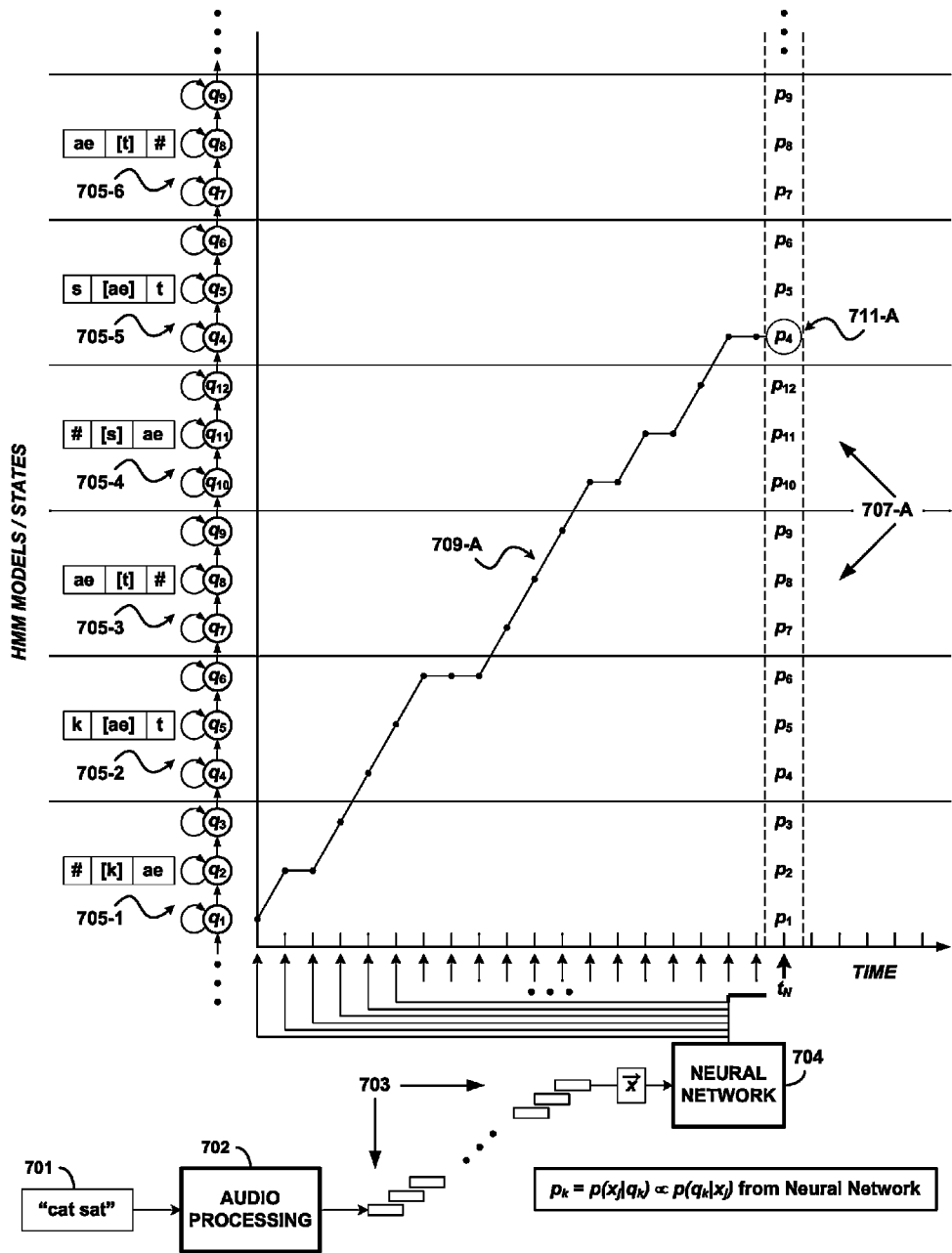
FIG. 7A is a schematic illustration of applying emission probabilities determined by a neural network to hidden Markov models to determine speech content represented in feature vectors.
Figure 7B:
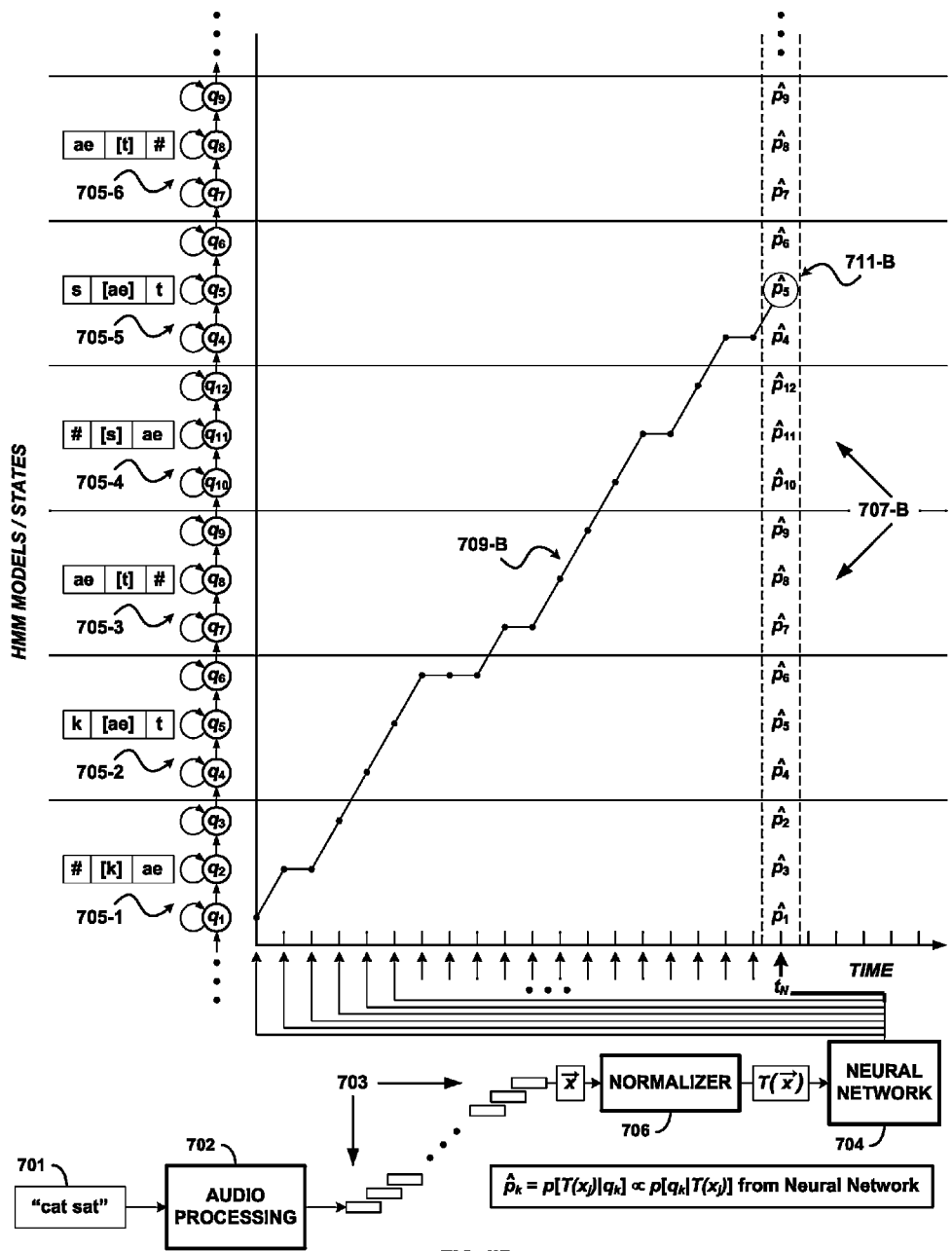
FIG. 7B is a schematic illustration of applying emission probabilities determined by a neural network to hidden Markov models to determine speech content represented in normalized feature vectors.

Run-time application of emission probabilities to hidden Markov models to determine speech content represented in feature vectors is illustrated schematically in FIGS. 7A and 7B, each of which depicts a graph of observed acoustic data along a time (horizontal) axis versus HMM states along a vertical axis. In both figures, an audio signal bearing an example utterance 701 of "cat sat" is input to an audio processing module 702, which samples the input in frames and outputs a time sequence of feature vectors 703. Differences between the examples illustrated in FIGS. 7A and 7B are discussed below.

In the example illustrated in FIG. 7A, the feature vectors 703, represented in the figure as a vector $\vec{x}$, are provided as input to a neural network 704, which outputs respective sets of emission probabilities at each neural network time step. The feature vectors 703 may be considered analogous to the feature vectors 601 shown in FIG. 6, and the neural network 704 may be considered analogous to the neural network 602 also in FIG. 6. Output of the emission probabilities at neural network time steps is represented as a series of short vertical arrows at times marked along the horizontal time axis, and occurs at the frame rate.

A multiplicity of HMMs 705-1, 705-2, 705-3, 705-4, 705-5, and 705-6 is represented as a portion of a concatenation of HMM states pictured along the vertical axis in FIG. 7A. Each HMM is used to model a respective triphone, and includes three states corresponding to three acoustic phases of the respective triphone. Each state is represented as a circle enclosing a state label $q_k$, such as $q_1$, $q_2$, $q_3$, etc. An arrow connecting adjacent states signifies a transition between the connected states, while a loop-shaped arrow signifies a "self-transition" that leaves a state unchanged after a given time step.

By way of example, the HMM 705-1 includes states $q_1$, $q_2$, and $q_3$ for modeling the triphone states #[k]ae.1, #[k]ae.2, and

[k]ae.3 of the triphone #[k]ae. Similarly, the HMM 705-2 includes states $q_4$, $q_5$, and $q_6$ for modeling the triphone states k[ae]t.1, k[ae]t.2, and k[ae]t.3 of the triphone k[ae]t. Continuing in this way, the HMM 705-3 includes states $q_7$, $q_8$, and $q_9$ for modeling the triphone states ae[t]#.1, ae[t]#.2, and ae[t]#.3 of the triphone ae[t]#; the HMM 705-4 includes states $q_{10}$, $q_{11}$, and $q_{12}$ for modeling the triphone states #[s]ae.1, #[s]ae.2, and #[s]ae.3 of the triphone #[s]ae; the HMM 705-5 includes states $q_4$, $q_5$, and $q_6$ for modeling the triphone states s[ae]t.1, s[ae]t.2, and s[ae]t.3 of the triphone s[ae]t; and the HMM 705-6 includes states $q_7$, $q_8$, and $q_9$ for modeling the triphone states ae[t]#.1, ae[t]#.2, and ae[t]#.3 of the triphone ae[t]#.

Note that, for purposes of illustration, the HMM 705-2 for k[ae]t and the HMM 705-5 for s[ae]t are made up of the same states $q_4$, $q_5$, and $q_6$. This repetition of states is meant to represent how HMM and HMM states may be shared among similar triphones. Similarly, the HMM 705-3 for ae[t]# and the HMM 705-6 also for ae[t]# are made up of the same states $q_7$, $q_8$, and $q_9$. The sharing of states is an example of "clustering" of similar triphones, which may help reduce the number of states that needs to be considered at each time step, as described below.

For a HNN/HMM implementation such as in the present example, the neural network 704 outputs of K emission probabilities for the states of the HMMs at each neural network time step; i.e. at the frame rate. By applying the K emission probabilities to the K HMM states, one of the K states is determined to be most probable at each neural network time step. By repeating this determination at each neural network time step, a path 709-A through the graph of observed acoustic data versus HMM states is mapped out by connecting successive points in the graph, also at the frame rate. The path 709 then represents the most likely sequence of HMMs and HMM states, and thereby yields the sequence of triphones in the corpus that most probably corresponds to the input utterance 701, as represented in the feature vectors 703.

By way of example in FIG. 7, a set of emission probabilities 707-A is shown as being output from the neural network 704 at a current neural network time step $t_N$. The emission probabilities 707-A are labeled as $p_1$, $p_2$, $p_3$, $p_4$, . . . , and may be applied to similarly indexed HMM states. Note that $p_4$, $p_5$, and $p_6$ are repeated for the HMMs 705-2 and 705-5. Similarly, $p_7$, $p_8$, and $p_9$ are repeated for the HMMs 705-3 and 705-6. As indicated by the circle 711-A enclosing probability $p_4$, the HMM state $q_4$ of the HMM 705-5 is the most probable next state in this example. The immediately preceding state in this example was also $q_4$ of the HMM 705-5. A legend at the lower right of FIG. 7A reiterates the proportional relation between the a priori emission probabilities and the a posteriori conditional probabilities generated by the neural network.

As indicated by the vertical ellipses extending from HMM 705-6, there may be additional HMMs (and states) available to model the input utterance 701. In particular, considering 40 phonemes (the approximate number for spoken English), there could be approximately $40^3=64,000$ triphones, and thus $3 \times 64,000 = 192,000$ possible HMM triphone states to consider for each feature vector. Clustering of similar triphones and/or triphone acoustic phases, plus constraints that may rule out certain sequences of states, can help reduce this number to approximately 8,000 HMM states. Clustering is represented in FIG. 7A by the repetition of states (e.g., for HMMs 705-2 and 705-5; and for HMMs 705-3 and 705-6), and the repetition of emission probabilities (e.g., $p_4$, $p_5$, and $p_6$; and $p_7$, $p_8$, and $p_9$).

In the example illustrated in FIG. 7A, the feature vectors 703 may include both phonetic and supra-phonetic features of the input audio signal. More particularly, phonetic features may be considered as corresponding to acoustic properties of the input audio signal that are inherent to fundamental speech units (such as phonemes and/or triphones). Inherent acoustic properties could include, for example, one or more characteristic frequencies, frequency differences between characteristic frequencies, spectral power, or power ratios. To the extent that they correspond to inherent acoustic properties, phonetic features can be largely decoupled from supra-phonetic factors of speech production that may vary from one speaker (or source) to another. As such, particular phonetic features and/or combinations thereof may be indicative of particular fundamental speech units, and their presence in feature vectors may therefore serve as signatures of particular speech units.

Supra-phonetic features may be considered as corresponding to acoustic properties of the input audio signal that arise from factors other than inherent acoustic properties of fundamental speech units. Examples supra-phonetic acoustic properties include pitch, tone, and accent, all of which could vary from one speaker to another. Factors that give rise to speaker-dependent supra-phonetic features may include vocal tract length, or other anatomical characteristics of speech production, for example. Other examples of supra-phonetic features could include environmental effects, such as echo, noise, or channel distortion.

The effect of supra-phonetic acoustic properties in a signal can be to distort or confuse one or more distinctive aspects of phonetic acoustic properties of the signal, thereby reducing or degrading identifiable distinctions between fundamental speech units as represented in feature vectors, for example. More specifically, feature vectors that correspond to different fundamental speech units (or portions thereof) may become less distinct from one another as their supra-phonetic content increases. As a result, a neural network trained to recognize feature vectors based on phonetic features may be less effective in discriminating between feature vectors when the supra-phonetic content is too great, for example when it exceeds one or another threshold or level. Misidentified or misrecognized feature vectors may adversely affect the quality of emission probabilities generated by the neural network, and correspondingly reduce the accuracy of speech recognition that use HMM sequences based on the determined probabilities. Accordingly, the accuracy of the emission probabilities 707-A may reflect adverse effects of having been generated from feature vectors that include supra-phonetic features.

It may be possible to reduce or remove the effects of supra-phonetic acoustic properties from feature vectors corresponding to an audio signal through a process of referred to generically herein as "normalization." Supra-phonetic features may be present in a feature vector as additive features to phonetic features and/or as modified or altered characteristics of phonetic features. Accordingly, various techniques for normalizing feature vectors may apply computational processing that removes or reduces additive features, for example by subtracting them (or approximations of them). Other types of normalization processing may include rescaling feature vectors with averaged values in order to restore inherent properties of phonetic features by shifting frequencies or scaling spectral powers. For the purposes of the discussion herein, however, supra-phonetic features are spoken of as if they are distinct, additive features, and as if normalization involves subtraction of one form or another. However, it should be understood that normalization can correspond more generally to a process that yields a normalized feature vector; namely a feature vector that includes predominantly phonetic features, or at least features that may be recognized as such by a neural network.

It will be appreciated that a variety of techniques may be used for normalizing processing. Examples include Spectral Subtraction, Vocal Tract Length Normalization, Constrained Maximum Likelihood Regression, Feature Space Maximum Likelihood Regression, Speaker Adaptive Training, Cluster Adaptive Training, and Feature Space Minimum Phone Error. These techniques may be implemented as executable instructions stored in one or another form of non-transient computer readable media, and executed by one of more processors, for example.

An example of applying run-time normalization of feature vectors is illustrated in FIG. 7B, which depicts the same schematic system as in FIG. 7A, but with the addition of a normalizing component in front of the input to the neural network 704. Specifically, in the example illustrated in FIG. 7B, the feature vectors 703, represented again as a vector $\vec{x}$, are provided as input to the normalizer 706, which generates normalized feature vectors, signified in the figure as $T(\vec{x})$. The normalized feature vectors are then provided as input to the neural network 704. The remainder of processing is the same as that described above in connection with FIG. 7A. However, by normalizing the feature vectors prior input to the neural network 704, the neural network may more reliably recognize the feature vectors, and correspondingly more accurately determine emission probabilities.

For purposes of illustration in FIG. 7B, a set of emission probabilities 707-B is shown as being output from the neural network 704 at a current neural network time step $t_{N'}$. The emission probabilities 707-B are labeled as $\hat{p}_1$, $\hat{p}_2$, $\hat{p}_3$, $\hat{p}_4$, . . . , to conceptually distinguish them from the emission probabilities 707-A in FIG. 7A. As in the example of FIG. 7A, the emission probabilities 707-B may be applied to similarly indexed HMM states. However, since they result from normalized feature vectors $T(\vec{x})$, the emission probabilities 707-B may be more accurate than the emission probabilities 707-A. Also for purposes of conceptual illustration, a path 709-B through the graph in FIG. 7B is depicted as slightly different from the path 709-A in FIG. 7A, and, as indicated by the circle 711-B enclosing the probability $\hat{p}_5$, the most probable HMM state is shown to be $q_5$ of the HMM 705-5 instead of $q_4$. A legend at the lower right of FIG. 7B reiterates the proportional relation between the a priori emission probabilities and the a posteriori conditional probabilities generated by the neural network from the normalized feature vectors $T(\vec{x})$.

As described above, the normalizer 706 could implement one more of the techniques listed above as executable instructions stored in one or another form of non-transient computer readable media, and executed by one of more processors, for example.

It will be appreciated that the slightly different depictions in FIGS. 7A and 7B are intended to conceptually illustrate differences that can result from normalization of the feature vectors 703, in order to facilitate the discussion of the presumably better results achieved through normalization. However the particular differences as illustrated are not necessarily intended to convey specific quantitative information about the differences between the two figures.

While normalization of feature vectors prior to input to a neural network may help improve the accuracy of feature recognition and resulting speech recognition, carrying out normalization at run-time can be computationally expensive, and even impractical. In this sense, FIG. 7B may be considered as at least a conceptual illustration of the effect of normalization. However, it would nevertheless be desirable to be able to perform normalization in some effective manner during run-time operation of an ASR system. Accordingly, example embodiments provide a method and system for training a neural network to effectively incorporate normalization in the recognition process. This capability is introduced during training using adaptive auto-encoders, and is described below.

c. Example Auto-Encoder Operation

Figure 8:
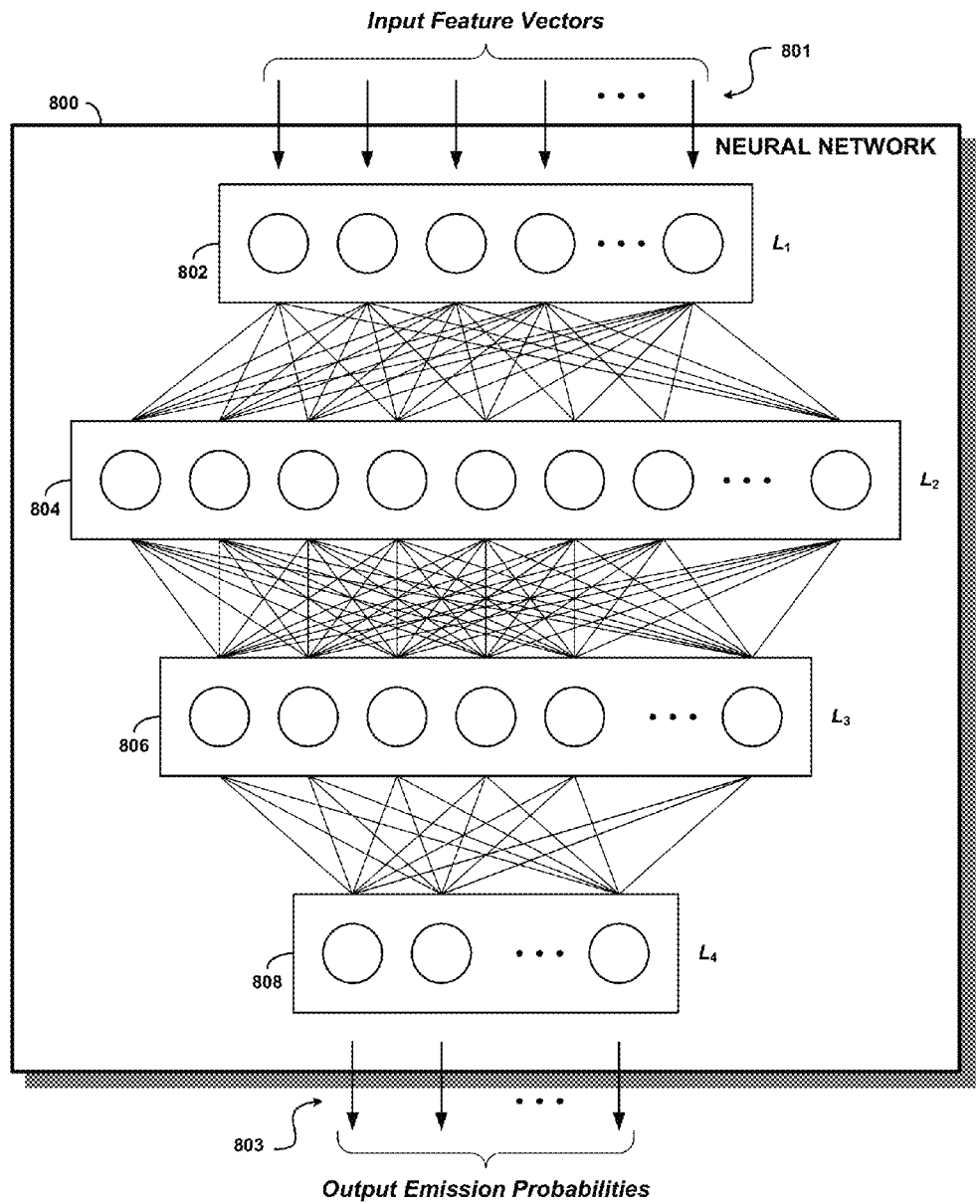
FIG. 8 is a schematic illustration of a neural network used for determining emission probabilities for hidden Markov models from input feature vectors.

An auto-encoder can be viewed as a configuration of a neural network architecture that may be operated in order to train the neural network to recognize, subsequent to training, particular forms or types of input. It is useful to briefly consider a generalized form of neural network architecture and operation in order to help describe example operation and training of an auto-encoder. FIG. 8 is a schematic illustration of a neural network 800 that could be used for determining emission probabilities 803 for hidden Markov models from input feature vectors 801. As shown, the neural network 800 includes "layers" 802, 804, 806, and 808, labeled $L_1$, $L_2$, $L_3$, and $L_4$, respectively. Each layer includes a set of nodes, represented as circles in FIG. 8. Horizontal ellipses in each layer signify possible nodes in addition to the ones explicitly shown. The number of layers (four) and the number of nodes shown are just examples for the purposes of illustration. Any particular neural network could have more or fewer layers and/or nodes.

The layer 802 ($L_1$) receives input, and may be referred to as an input layer. In the example of FIG. 8, the input is input feature vectors 801 (represented as vertical arrows). The horizontal ellipses signify possible feature vectors in addition to the ones explicitly shown. The layer 808 ($L_4$) delivers output, and may be referred to as an output layer. In the example of FIG. 8, the output is output emission probabilities 803 (represented as vertical arrows). The horizontal ellipses signify possible emission probabilities in addition to the ones explicitly shown. The layers 804 ($L_2$) and 806 ($L_3$) may sometimes be referred to as "hidden layers."

Each node in the neural network 800 may correspond to a mathematical function having adjustable parameters, and from which can be computed a scalar output of one or more inputs. All of the nodes may be the same scalar function, differing only according to possibly different parameter values, for example. By way of example, the mathematical function could take the form of a sigmoid function. It will be appreciated that other functional forms could be used as well. As shown, the output of each node of a given layer is connected to the input of every node in the next layer, except that the input layer receives its input from data presented to the neural network (e.g., feature vectors 801 in the present example), and the output layer delivers output data from the neural network (e.g., emission probabilities 803 in the present example). Taking the example of a sigmoid function, each node could compute a sigmoidal nonlinearity of a weighted sum of its inputs.

By appropriately adjusting the respective parameter values of the functions of the nodes during a training process, the neural network 800 can be made to recognize feature vectors subsequently input at run time and to responsively generate and output emission probabilities. The training process may involve both training for recognition of input, and training for generation of emission probabilities. Both types of training may involve providing the neural network with training data having associated known results, and adjusting the parameters to cause the neural network to reproduce the results as close as possible to the known results. In particular, training the neural network to recognize feature vectors may be achieved by configuring the neural network as an auto-encoder.

A neural network, such as neural network 800, including its layers, nodes, and connections between nodes may be implemented as executable instructions stored in one or another form of non-transient computer readable media, and executed by one of more processors of an ASR system, for example.

Figure 9:
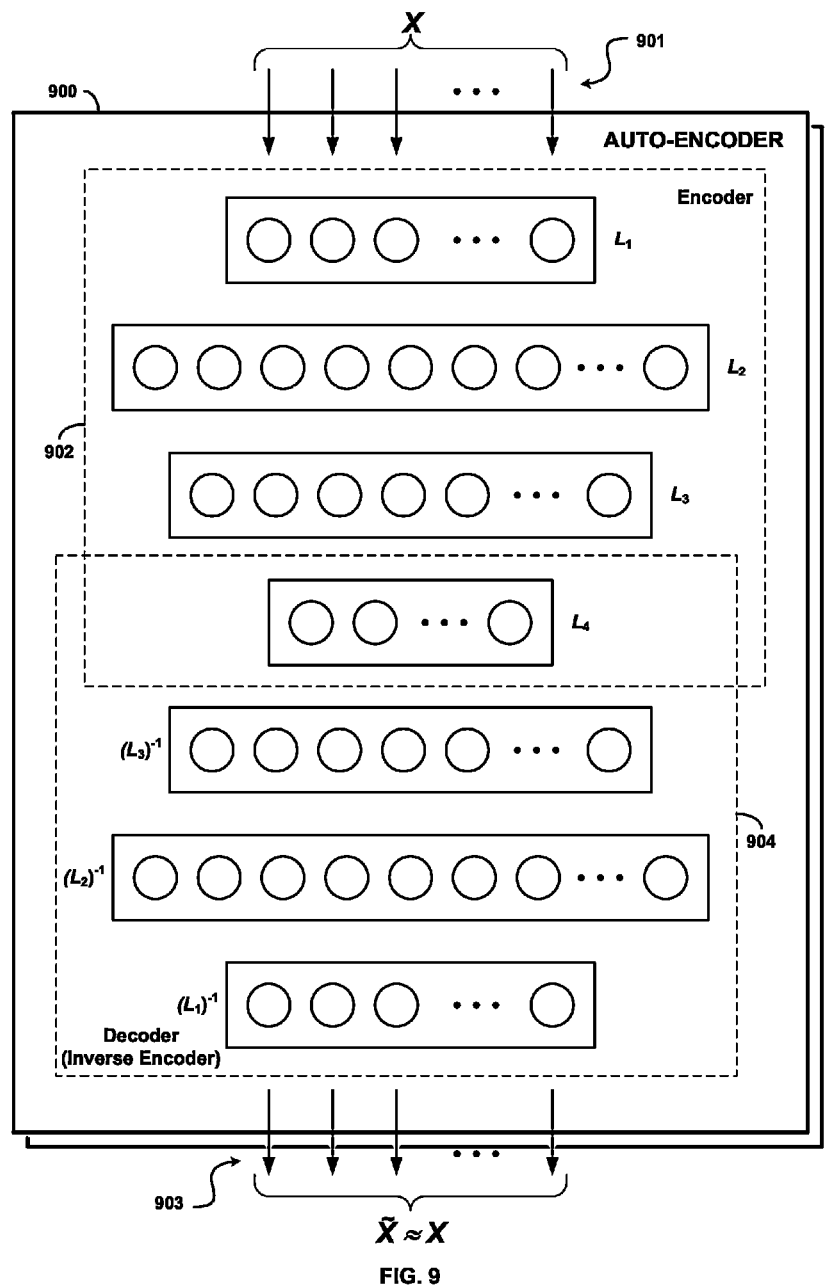
FIG. 9 is a schematic illustration of an auto-encoder.

FIG. 9 is a schematic illustration of an auto-encoder 900, which may include an encoder 902 and a decoder 904. As shown, the encoder 902 may be constructed from a set of "forward neural network layers" $L_1$, $L_2$, $L_3$, and $L_4$, and the decoder 904 may be constructed from a set of "inverse neural network layers" $(L_4)^{-1}$, $(L_3)^{-1}$, $(L_2)^{-1}$, and $(L_1)^{-1}$. The encoder 902 and decoder 904 share a common layer ($L_4$) in the example encoder 900. Other arrangements are possible as well. The decoder 904, also referred to as an "inverse encoder," may be arranged to perform the inverse operations of the encoder. Processing by the encoder is referred to herein as "forward processing," while processing by the decoder is referred to herein as "inverse processing." By configuring the decoder 904 to serially follow the encoder 902, the decoder 904 may operate to effectively "undo" the encoding of input carried out by the encoder 902. Thus, the output of the encoder becomes the input to the decoder. The output of the decoder is referred to herein as "recovered" data.

In practice, the process of encoding (forward processing) with the encoder 902, which can involve operations on the input data by layers and nodes similar to those of a neural network, may alter the input data and/or loose or modify information such that the data recovered by the decoder is not identical to the data originally input to the encoder 902. This is illustrated in FIG. 9 by a representation of the input data 901 as a vector X and the output data 903 as a vector $\tilde{X}$, where, as shown, $\tilde{X} \approx X$. By training the auto-encoder to generate an output $\tilde{X}$ that is as close as possible to an input X for a body of training data representing a variety of examples of input X, the encoder can be caused to subsequently recognize new instances of input as being the same or similar to X as learned from the training data.

Figure 10:
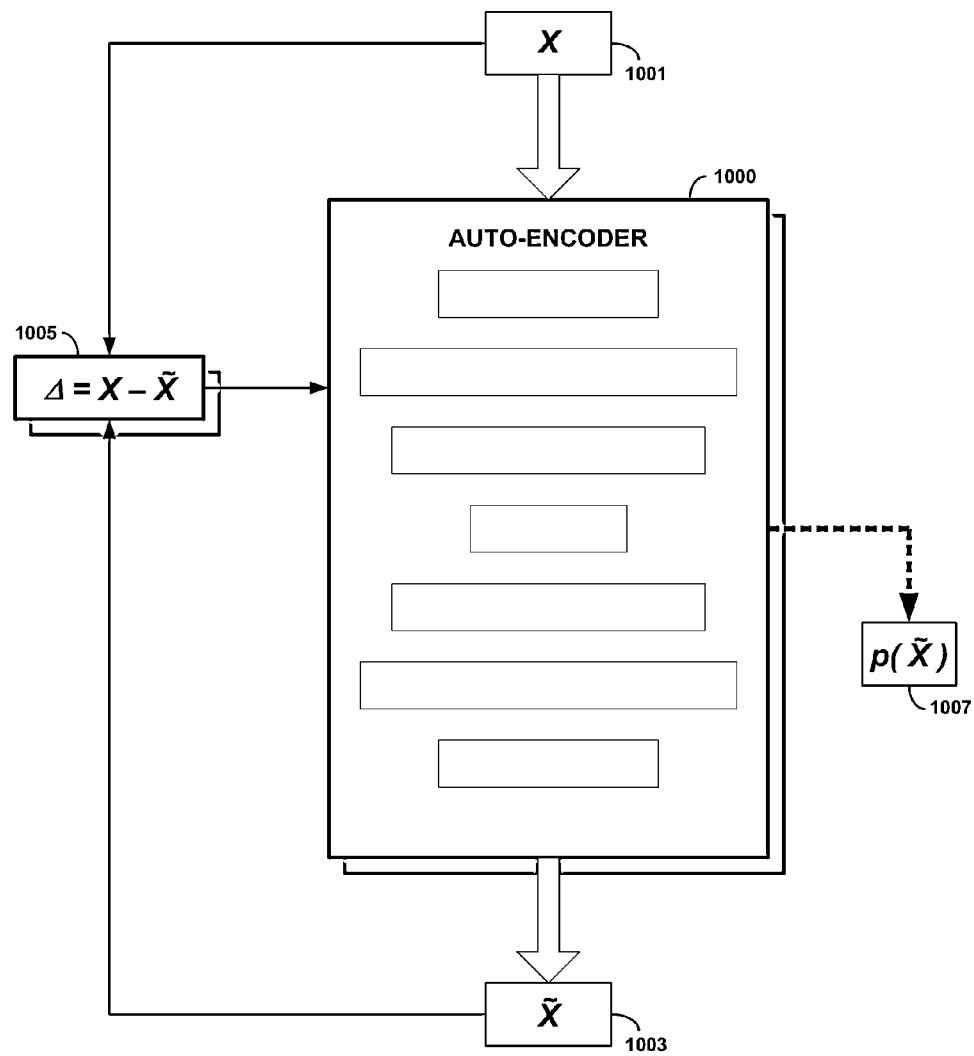
FIG. 10 is a schematic illustration of training of an auto-encoder.

Training of an auto-encoder is illustrated schematically in FIG. 10. As shown, an auto-encoder 1000, depicted as a rectangle containing representative neural network layers, receives an input 1001, designated X, and generates an output 1003, designated $\tilde{X}$. Training is accomplished by computing an error signal 1005 in the form $\Delta = X - \tilde{X}$, and providing it to the auto-encoder 1000 as feedback during a training process carried out over a body of training data, representing a variety of examples of input X. By adjusting the auto-encoder 1000 so as to minimize the magnitude of the error signal 1005 (or reduce it below a threshold level) during training, the auto-encoder can be caused to reproduce its input as accurately as possible (or to within a threshold accuracy level). Correspondingly, by adjusting the auto-encoder 1000 to reproduce its input as faithfully as possible for a body of training data, the auto-encoder 1000 may thereby be trained to subsequently recognize input data as being the same or similar to the training data, or as likely (to within some likelihood level) coming from one or another known distribution of training data.

Subsequent to training the auto-encoder 1000, forward processing of input data may serve as a "front-end" to one or more processes that may produce other forms of output, the accuracy of which may depend on, rely on, or be linked to, the accuracy of the recognition by the auto-encoder. In particular, in a HNN/HMM-based ASR system, the forward processing of feature vectors may serve as a front-end to a process that generates emission probabilities, as described above. This is indicated schematically in FIG. 1000 by the output 1007 of probabilities $p(\tilde{X})$, which represents emission probabilities for input feature vector X, as recognized by the auto-encoder 1000. The dashed arrow to the output 1007 represents the application of forward processing subsequent to training the auto-encoder 1000. Thus, the error signal 1005 provided as feedback during training is not necessarily provided during run-time operation.

An auto-encoder, such as auto-encoders 900 and/or 1000, as well functional elements for training (e.g., forming error signal 1005), may be implemented as executable instructions stored in one or another form of non-transient computer readable media, and executed by one of more processors of an ASR system, for example.

As discussed above, the presence of supra-phonetic features in feature vectors can adversely affect the ability of a neural network to accurately recognize phonetic features of the feature vectors. Using training data with a variety of supra-phonetic acoustic content may not help improve training, since degradation and/or confusion of phonetic content in the training data may correspondingly degrade an auto-encoder's ability to distinguish phonetic features. Using training data with low supra-phonetic acoustic content may help improve accuracy of recognition during training, but may not help when the trained neural network is subsequently faced with supra-phonetic features during run-time operation. While normalization of feature vectors during run-time operation can, in principle, help mitigate the impact of supra-phonetic features in run-time feature vectors, run-time normalization may be computationally expensive and/or impractical to implement, as discussed above. However, a neural network may be trained to recognize phonetic acoustic properties of an input audio signal by training it adaptively, as described below. Such an approach may effectively and efficiently incorporate a form of normalization into the recognition process.

d. Example Adaptive Auto-Encoder Operation

In accordance with example embodiments, an auto-encoder may be trained adaptively by providing as feedback an error signal based on a recovered signal and a normalized form to the corresponding input signal. Such an adaptively trained auto-encoder is referred to herein as an "adaptive auto-encoder."

Figure 11:
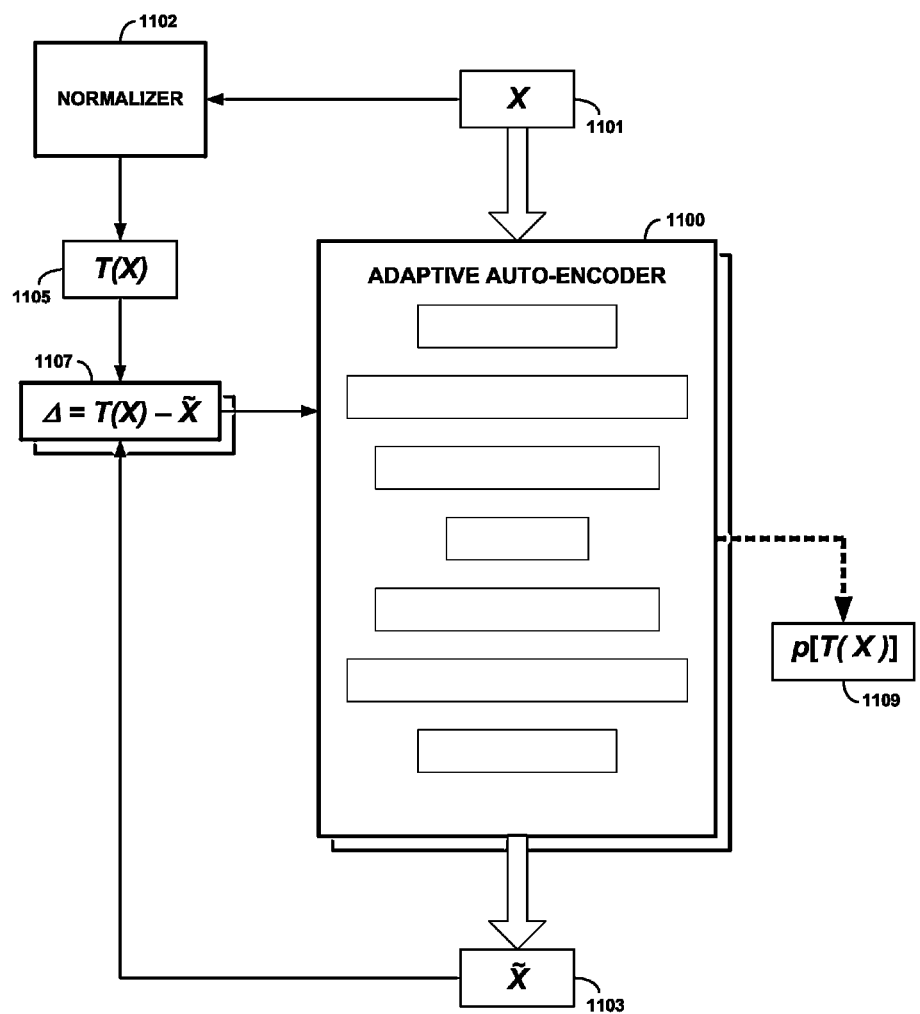
FIG. 11 is a schematic illustration of training of an adaptive auto-encoder, in accordance with an example embodiment.

FIG. 11 is a schematic illustration of training of an adaptive auto-encoder, in accordance with example embodiments. In the figure, an adaptive auto-encoder 1100, depicted as a rectangle containing representative neural network layers, receives an input 1101, designated X, and generates an output 1103, designated $\tilde{X}$. As shown, the input 1101 is also provided to a normalizer 1102, which may normalize X using one or another of the techniques described above, for example. The normalizer may compute a normalized output 1105, designated T(X), in keeping with the notation introduced earlier. Adaptive training may then be accomplished by computing an error signal 1107 in the form $\Delta = T(X) - \tilde{X}$ (or $|T(X) - \tilde{X}|$), and providing it to the adaptive auto-encoder 1100 as feedback during a training process carried out over a body of training data, representing a variety of examples of input X.

By adjusting the adaptive auto-encoder 1100 so as to minimize the magnitude of the error signal 1107 (or reduce it below a threshold level, such as 5%, for example) during training, the adaptive auto-encoder can be caused to generate a normalized form of its input as accurately as possible (or to within a threshold accuracy level), even though it receives an un-normalized form as input. Correspondingly, by adjusting the adaptive auto-encoder 1100 to reproduce the normalized form its input as faithfully as possible from un-normalized input for a body of training data, the adaptive auto-encoder 1100 may thereby be trained to subsequently recognize un-normalized input data as being the same or similar to the normalized form of the training data.

Subsequent to training the adaptive auto-encoder 1100, forward processing of un-normalized input data may serve as a front-end to one or more processes that may produce other forms of output, the accuracy of which may depend on, rely on, or be linked to, the accuracy of the recognition of a normalized form of the input by the adaptive auto-encoder. A HNN/HMM-based ASR system, in which the forward processing of feature vectors may serve as a front-end to a process that generates emission probabilities, again provides an example. This is indicated schematically in figure 1100 by the output 1009 of probabilities p[T(X)], which represents emission probabilities for a normalized form of input feature vector X, as recognized by the auto-encoder 1100. The dashed arrow to the output 1009 represents the application of forward processing subsequent to training the adaptive auto-encoder 1100. Again, the error signal 1007 provided as feedback during training is not necessarily provided during run-time operation.

An adaptive auto-encoder, such as adaptive auto-encoder 1100 and normalizer 1102, as well functional elements for training (e.g., forming error signal 1107), may be implemented as executable instructions stored in one or another form of non-transient computer readable media, and executed by one of more processors of an ASR system, for example.

Because training may be carried out "offline" from runtime operation—e.g., at an earlier time, without impacting run-time operation—computational costs and/or practical implications of implementing and/or carrying out normalization may become less important or even be eliminated from consideration. This because normalization of the training data, for example by the normalizer 1102, can also be carried out offline. Yet the benefits of normalization may still be realized in a neural network that is trained by way of an adaptive auto-encoder. Such a neural network is referred to herein as a "normalizing neural network." Note, however, that a normalizing neural network may not actually perform normalization during run-time operation, in the sense of actually generating normalized feature vectors. Rather, a normalizing neural network may be able to effectively and efficiently recognize un-normalized input in its normalized form, without converting or transforming its input into a normalized form.

The effectiveness of an adaptive auto-encoder to recognize a normalized form of input data may depend, at least in part, on the variety of those characteristics or properties of the input data for which adaptive auto-encoder is trained to compensate, and the extent to which they are present in the training data. In the case of an ASR, an adaptive auto-encoder may be trained to compensate for supra-phonetic features, as described above. Some supra-phonetic acoustic properties, such as speaker pitch, tone, and/or accent, may enter training data naturally during acquisition of the training data. Other supra-phonetic acoustic properties, such as noise, echo, and/or channel distortion, could be added (e.g., artificially) at a later stage or even during training of an adaptive auto-encoder.

Normalization of the training data used for training an adaptive auto-encoder could be carried out during training, for example concurrently with generation of the error signal 1107. Alternatively, normalization of training data could be carried out prior to training and stored in a normalized form. Then, during training the normalized training data could be retrieved and the error signal 1107 generated as feedback.

Figure 12:
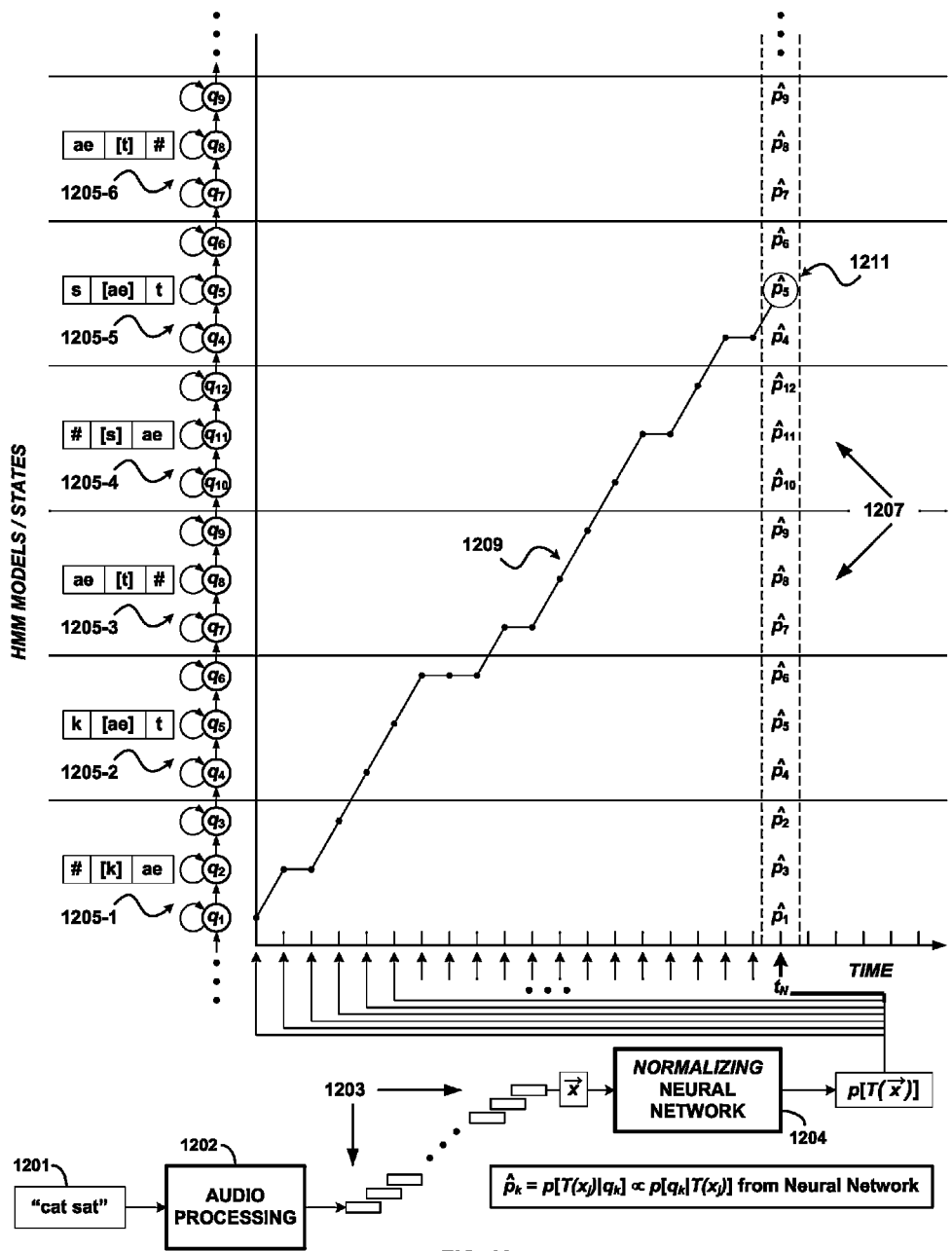
FIG. 12 is a schematic illustration of applying emission probabilities determined by a normalizing neural network to hidden Markov models to determine speech content represented in feature vectors, in accordance with an example embodiment.

FIG. 12 is a schematic illustration of applying emission probabilities determined by a normalizing neural network to hidden Markov models to determine speech content represented in feature vectors, in accordance with example embodiments. As shown, an audio signal bearing an example utterance 1201 of "cat sat" is input to an audio processing module 1202, which samples the input in frames and outputs a time sequence of feature vectors 1203. Feature vectors 1203, represented as a vector $\vec{x}$, are provided as input to a normalizing neural network 1204, which generates emission probabilities $\hat{p}=p[T(\vec{x})]$. Thus, as in the example illustrated in FIG. 7B above, the neural network outputs emission probabilities corresponding to a normalized form of input feature vectors. However, unlike the example of FIG. 7B, the normalizing neural network 1204 generates $\hat{p}=p[T(\vec{x})]$ directly from un-normalized input feature vectors 1203. The presence of a run-time normalizer, such as normalizer 706 in FIG. 7B, can be eliminated. Accordingly, the example system illustrated in FIG. 12 can function more effectively and efficiently than the one illustrated in FIG. 7B.

Following generation of the emission probabilities $\hat{p}=p[T(\vec{x})]$ at each neural network time step, operation of the ASR illustrated in FIG. 12 proceeds as discussed above in connection with FIGS. 7A and 7B. Specifically, a multiplicity of HMMs 1205-1, 1205-2, 1205-3, 1205-4, 1205-5, and 705-6 is represented as a portion of a concatenation of HMM states pictured along the vertical axis in FIG. 12. A set of emission probabilities 1207 is shown as being output from the normalizing neural network 1204 at a current neural network time step $t_N$. The emission probabilities 1207 are labeled as $\hat{p}_1$, $\hat{p}_2$, $\hat{p}_3$, $\hat{p}_4$, ..., indicate that they correspond to a normalized form of the input feature vectors 1203. Note, however, that the emission probabilities 1203 may not necessarily be identical to the emission probabilities 707-B, even though both sets of emission probabilities correspond to normalized forms of input feature vectors. This is because the feature vectors 703 in the example of FIG. 7B are transformed to a normalized form by the normalizer 706 prior to being processed by the neural network 704. In contrast, the feature vectors 1203 in the example of FIG. 12 are provided directly to the normalizing neural network 1204, which, as described above, recognizes their normalized form.

The emission probabilities 1207 may then be applied to similarly indexed HMM states. A path 1209 through the graph in FIG. 12 represents the most likely sequence of HMMs and HMM states, and thereby yields the sequence of triphones in the corpus that most probably corresponds to the input utterance 1201, as represented in the (un-normalized) feature vectors 1203. By way of example, the circle 1211 enclosing probability $\hat{p}_5$ indicates the HMM state $q_5$ of the HMM 1205-5 is the most probable next state in this example. A legend at the lower right of FIG. 12 reiterates the proportional relation between the a priori emission probabilities and the a posteriori conditional probabilities generated by the neural network.

CONCLUSION

An illustrative embodiment has been described by way of example herein. Those skilled in the art will understand, however, that changes and modifications may be made to this embodiment without departing from the true scope and spirit of the elements, products, and methods to which the embodiment is directed, which is defined by the claims.

What is claimed is:

1. A method comprising:
   transforming an input audio training signal, using one or more processors of a system, into a sequence of feature vectors, each feature vector of the sequence bearing quantitative measures of acoustic properties of the input audio training signal;
   processing the sequence of feature vectors with an auto-encoder implemented by the one or more processors to generate (i) an encoded form of the quantitative measures, and (ii) a recovered form of the quantitative measures based on an inverse operation by the auto-encoder on the encoded form of the quantitative measures;
   processing a duplicate copy of the sequence of feature vectors with a normalizer implemented by the one or more processors to generate a normalized form of the quantitative measures in which supra-phonetic acoustic properties of the input audio training signal are reduced in comparison with phonetic acoustic properties of the input audio training signal;
   determining an error signal based on a difference between the normalized form of the quantitative measures and the recovered form of the quantitative measures;
   providing the error signal to the auto-encoder; and
   by adjusting parameters of the auto-encoder to reduce the magnitude of the error signal, training the auto-encoder to compensate for supra-phonetic acoustic properties of input audio signals.

2. The method of claim 1, wherein the auto-encoder and the normalizer are implemented by at least one common processor from among the one or more processors of the system.

3. The method of claim 1, wherein the quantitative measures of acoustic properties are at least one of Mel Filter Cepstral coefficients, Perceptual Linear Predictive coefficients, Relative Spectral coefficients, or Filterbank log-energy coefficients.

4. The method of claim 1, wherein the auto-encoder comprises a first sequential set of neural network layers adapted for forward processing of input, and a second sequential set of neural network layers adapted for inverse processing of input,
   and wherein processing the sequence of feature vectors with the auto-encoder comprises:
   forward processing the sequence of feature vectors with the first sequential set to generate the encoded form of the quantitative measures; and
   inverse processing the encoded form of the quantitative measures with the second sequential set to generate the recovered form of the quantitative measures.

5. The method of claim 4, wherein training the auto-encoder to compensate for supra-phonetic features of input audio signals further comprises adjusting the auto-encoder to cause it to recognize, via forward processing of input feature vectors corresponding to the input audio signals, a normalized form of quantitative measures of acoustic properties of the input audio signals,
   and wherein the method further comprises:
   subsequent to training the auto-encoder, forward processing a run-time sequence of feature vectors corresponding to a run-time input audio signal to determine emission probabilities for states of hidden Markov models (HMMs) implemented by the one or more processors; and
   applying the determined emission probabilities to the HMMs to determine speech content corresponding to at least a portion of the run-time input audio signal.

6. The method of claim 1, wherein the supra-phonetic acoustic properties are indicative of particular audio characteristics, the particular audio characteristics being at least one of pitch, tone, prosody, tempo, accent, microphone equalization, or channel distortion,
   and wherein processing the duplicate copy of the sequence with the normalizer comprises generating a normalized signal in which the particular audio characteristics have been reduced to less than a threshold level.

7. The method of claim 1, wherein processing the duplicate copy of the sequence comprises compensating for supra-phonetic acoustic properties of the input audio training signal by normalizing the feature vectors of the sequence using at least one of Spectral Subtraction, Vocal Tract Length Normalization, Constrained Maximum Likelihood Regression, Feature Space Maximum Likelihood Regression, Speaker Adaptive Training, Cluster Adaptive Training, or Feature Space Minimum Phone Error.

8. The method of claim 1, wherein the recovered form of the quantitative measures corresponds to a reference signal and the normalized form of the quantitative measures corresponds to a normalized signal,
   and wherein determining the error signal comprises subtracting the reference signal from the normalized signal.

9. The method of claim 1, wherein providing the error signal to the auto-encoder comprises providing the error signal to the auto-encoder concurrently with processing the sequence of feature vectors with the auto-encoder.

10. The method of claim 1, further comprising adding noise to the input audio training signal prior to transforming the input audio training signal.

11. A system comprising:
    one or more processors;
    memory; and
    machine-readable instructions stored in the memory, that upon execution by the one or more processors cause the system to carry out operations comprising:
    transforming an input audio training signal into a sequence of feature vectors, wherein each feature vector of the sequence bears quantitative measures of acoustic properties of the input audio training signal,
    processing the sequence of feature vectors with an auto-encoder to generate (i) an encoded form of the quantitative measures, and (ii) a recovered form of the quantitative measures based on an inverse operation by the auto-encoder on the encoded form of the quantitative measures,
    processing a duplicate copy of the sequence of feature vectors with a normalizer to generate a normalized form of the quantitative measures in which supra-phonetic acoustic properties of the input audio training signal are reduced in comparison with phonetic acoustic properties of the input audio training signal,
    determining an error signal based on a difference between the normalized form of the quantitative measures and the recovered form of the quantitative measures,
    providing the error signal to the auto-encoder, and
    by adjusting parameters of the auto-encoder to reduce the magnitude of the error signal, training the auto-encoder to compensate for supra-phonetic acoustic properties of input audio signals.

12. The system of claim 11, wherein the system further comprises the auto-encoder and the normalizer,
    wherein the auto-encoder comprises a first sequential set of neural network layers adapted for forward processing of input, and a second sequential set of neural network layers adapted for inverse processing of input, and wherein processing the sequence of feature vectors with the auto-encoder comprises:
forward processing the sequence of feature vectors with the first sequential set to generate the encoded form of the quantitative measures; and
inverse processing the encoded form of the quantitative measures with the second sequential set to generate the recovered form of the quantitative measures.

13. The system of claim 12, wherein training the auto-encoder to compensate for supra-phonetic features of input audio signals further comprises adjusting the auto-encoder to cause it to recognize, via forward processing of input feature vectors corresponding to the input audio signals, a normalized form of quantitative measures of acoustic properties of the input audio signals,
and wherein the operations further comprise:
subsequent to training the auto-encoder, receiving a run-time sequence of feature vectors corresponding to a run-time audio input signal;
forward processing the received run-time sequence of feature vectors with the first sequential set of neural network layers to determine emission probabilities for states of hidden Markov models (HMMs) of the system; and
applying the determined emission probabilities to the HMMs to determine speech content corresponding to at least a portion of the run-time audio input signal.

14. The system of claim 11, wherein the system further comprises the normalizer,
wherein the supra-phonetic acoustic properties are indicative of particular audio characteristics, the particular audio characteristics being at least one of pitch, tone, prosody, tempo, accent, microphone equalization, or channel distortion,
and wherein processing the duplicate copy of the sequence with the normalizer comprises generating a normalized signal in which the particular audio characteristics have been reduced to less than a threshold level.

15. The system of claim 11, wherein processing the duplicate copy of the sequence comprises compensating for supra-phonetic acoustic properties of the input audio training signal by normalizing the feature vectors of the sequence using at least one of Spectral Subtraction, Vocal Tract Length Normalization, Constrained Maximum Likelihood Regression, Feature Space Maximum Likelihood Regression, Speaker Adaptive Training, Cluster Adaptive Training, or Feature Space Minimum Phone Error.

16. An article of manufacture including a non-transitory computer-readable storage medium, having stored thereon program instructions that, upon execution by one or more processors of a system, cause the system to perform operations comprising:
transforming an input audio training signal into a sequence of feature vectors, wherein each feature vector of the sequence bears quantitative measures of acoustic properties of the input audio training signal;
processing the sequence of feature vectors with an auto-encoder to generate (i) an encoded form of the quantitative measures, and (ii) a recovered form of the quantitative measures based on an inverse operation by the auto-encoder on the encoded form of the quantitative measures;
processing a duplicate copy of the sequence of feature vectors with a normalizer to generate a normalized form of the quantitative measures in which supra-phonetic acoustic properties of the input audio training signal are reduced in comparison with phonetic acoustic properties of the input audio training signal;
determining an error signal based on a difference between the normalized form of the quantitative measures and the recovered form of the quantitative measures;
providing the error signal to the auto-encoder; and
by adjusting parameters of the auto-encoder to reduce the magnitude of the error signal, training the auto-encoder to compensate for supra-phonetic acoustic properties of input audio signals.

17. The article of manufacture of claim 16, wherein the system comprises the auto-encoder and the normalizer,
wherein the auto-encoder comprises a first sequential set of neural network layers adapted for forward processing of input, and a second sequential set of neural network layers adapted for inverse processing of input,
and wherein processing the sequence of feature vectors with the auto-encoder comprises:
forward processing the sequence of feature vectors with the first sequential set to generate the encoded form of the quantitative measures; and
inverse processing the encoded form of the quantitative measures with the second sequential set to generate the recovered form of the quantitative measures.

18. The article of manufacture of claim 17, wherein training the auto-encoder to compensate for supra-phonetic features of input audio signals further comprises adjusting the auto-encoder to cause it to recognize, via forward processing of input feature vectors corresponding to the input audio signals, a normalized form of quantitative measures of acoustic properties of the input audio signals,
and wherein the operations further comprise:
subsequent to training the auto-encoder, receiving a run-time sequence of feature vectors corresponding to a run-time audio input signal;
forward processing the received run-time sequence of feature vectors with the first sequential set of neural network layers to determine emission probabilities for states of hidden Markov models (HMMs) of the system; and
applying the determined emission probabilities to the HMMs to determine speech content corresponding to at least a portion of the run-time audio input signal.

19. The article of manufacture of claim 16, wherein the system comprises the normalizer,
wherein the supra-phonetic acoustic properties are indicative of particular audio characteristics, the particular audio characteristics being at least one of pitch, tone, prosody, tempo, accent, microphone equalization, or channel distortion,
and wherein processing the duplicate copy of the sequence with the normalizer comprises generating a normalized signal in which the particular audio characteristics have been reduced to less than a threshold level.

20. The article of manufacture of claim 16, wherein processing the duplicate copy of the sequence comprises compensating for supra-phonetic acoustic properties of the input audio training signal by normalizing the feature vectors of the sequence using at least one of Spectral Subtraction, Vocal Tract Length Normalization, Constrained Maximum Likelihood Regression, Feature Space Maximum Likelihood Regression, Speaker Adaptive Training, Cluster Adaptive Training, or Feature Space Minimum Phone Error.

* * * * *